(12) United States Patent
Dave et al.

(10) Patent No.: US 9,112,607 B1
(45) Date of Patent: Aug. 18, 2015

(54) LOW POWER LOW COMPLEXITY CHROMATIC DISPERSION COMPENSATION

(71) Applicant: ViaSat, Inc., Carlsbad, CA (US)

(72) Inventors: Sameep Dave, Hinckley, OH (US); Fan Mo, Hinckley, OH (US); Yuri Zelensky, Lyndhurst, OH (US); Eric Fowlie, Middleburg Heights, OH (US)

(73) Assignee: ViaSat, Inc., Carlsbad, CA (US)

( * ) Notice: Subject to any disclaimer, the term of this patent is extended or adjusted under 35 U.S.C. 154(b) by 139 days.

(21) Appl. No.: 13/835,027

(22) Filed: Mar. 15, 2013

Related U.S. Application Data

(60) Provisional application No. 61/755,895, filed on Jan. 23, 2013.

(51) Int. Cl.
*H04B 10/2513* (2013.01)
*H04B 10/61* (2013.01)
*H04J 14/00* (2006.01)
*H04J 14/06* (2006.01)

(52) U.S. Cl.
CPC ...... *H04B 10/2513* (2013.01); *H04B 10/25133* (2013.01); *H04B 10/6161* (2013.01); *H04B 10/6162* (2013.01); *H04J 14/002* (2013.01); *H04J 14/06* (2013.01)

(58) Field of Classification Search
CPC .............. H04B 10/6161; H04B 10/25133; H04B 10/2513; H04B 10/6162; H04J 14/002; H04J 14/06
See application file for complete search history.

(56) References Cited

U.S. PATENT DOCUMENTS

| | | | | |
|---|---|---|---|---|
| 6,603,822 | B2 * | 8/2003 | Brede et al. | 375/340 |
| 7,636,525 | B1 * | 12/2009 | Bontu et al. | 398/208 |
| 2002/0098795 | A1 * | 7/2002 | Brede et al. | 455/3.01 |
| 2010/0142952 | A1 * | 6/2010 | Qian et al. | 398/65 |
| 2011/0053546 | A1 * | 3/2011 | Hess et al. | 455/296 |
| 2013/0259101 | A1 * | 10/2013 | Earnshaw et al. | 375/219 |
| 2014/0099116 | A1 * | 4/2014 | Bai et al. | 398/76 |

OTHER PUBLICATIONS

Chu Yu; Yi-Ting Liao; Mao-Hsu Yen; Pao-Ann Hsiung; Sao-Jie Chen, "A novel low-power 64-point pipelined FFT/IFFT processor for OFDM applications," Consumer Electronics (ICCE), 2011 IEEE International Conference on , vol., No., pp. 441,442, Jan. 9-12, 2011.*

* cited by examiner

*Primary Examiner* — Shuwang Liu
*Assistant Examiner* — Ross Varndell
(74) *Attorney, Agent, or Firm* — Holland & Hart LLP

(57) ABSTRACT

Methods, systems, and devices are described for filtering data from an optical signal to compensate for chromatic dispersion in an optical path. Samples of different polarizations are filtered in the frequency domain with a matched filter by time-sharing a conversion module. The conversion module first converts a set of samples to the frequency domain for filtering when in a Fast Fourier Transform (FFT) configuration and then converts the filtered set of samples back to the time domain when in an Inverse FFT (IFFT) configuration. The size of the FFT in the FFT configuration and of the IFFT in the IFFT configuration is the same as the size of the samples being processed by the conversion module to enable both configurations to be based on a set of constant multipliers. Both configurations may be based on a pipelined architecture to sequentially process the samples in an efficient manner.

19 Claims, 16 Drawing Sheets

LOW POWER LOW COMPLEXITY CHROMATIC DISPERSION COMPENSATION

CROSS REFERENCES

This application for patent claims priority benefit of U.S. provisional patent application Ser. No. 61/755,895 to Dave et al., entitled "Low Power Low Complexity Chromatic Dispersion Compensation," filed Jan. 23, 2013, the disclosure of which is incorporated herein in its entirety for all purposes.

BACKGROUND

The present disclosure relates to systems and methods digital modulation and demodulation of data in a fiber optic communications system.

Fiber optic channels in network communications systems are well known and are considered effective for data transmission, allowing relatively high bandwidth data communication. Optical fiber used in such channels is flexible and can be bundled as cables, and is generally considered to be appropriate for long-distance communications because light propagates through the fiber with little attenuation compared to electrical cables. Typical present day commercial optical fiber systems transmit data at rates of 10 or 40 Gigabit-per-second. Each fiber can carry multiple independent channels and each of the channels uses a different wavelength of light. This technique, which is known as wavelength-division multiplexing or WDM, enhances the net data rate of an optical fiber.

As more capacity is continually desired for networks, a demand for increased data transmission rates exists. However, in fiber optic systems, as data rates increase various optical phenomena begin to manifest and act to limit data transmission rates. For example, chromatic dispersion of a transmitted optical signal may occur between a transmitter and a receiver, and detrimentally affect the ability of the receiver to demodulate and decode the transmitted optical signal.

SUMMARY

Methods, systems, and devices are described for filtering data from an optical signal to compensate for chromatic dispersion in an optical path.

In a first set of embodiments, a method for filtering data from an optical signal includes converting to the frequency domain a current set of samples of one polarization using a module configured in a Fast Fourier Transform (FFT) mode, where the FFT mode configuration has constant multipliers and a size of the current set of samples matches a size of the FFT in the FFT mode configuration. The converted current set of samples is filtered to compensate for chromatic dispersion in an optical path. The filtered current set of samples is converted to the time domain using the same module configured in an Inverse Fast Fourier Transform (IFFT) mode, where the IFFT mode configuration has the same constant multipliers as the FFT mode configuration and a size of the filtered current set of samples matches a size of the IFFT in the IFFT mode configuration.

In a second set of embodiments, a system for filtering data from an optical signal includes means for converting to the frequency domain a current set of samples of one polarization using a module configured in an FFT mode, where the FFT mode configuration has constant multipliers and a size of the current set of samples matches a size of the FFT in the FFT mode configuration. The system includes means for filtering the converted current set of samples to compensate for chromatic dispersion in an optical path. The system also includes means for converting to the time domain the filtered current set of samples using the same module configured in an IFFT mode, where the IFFT mode configuration has the same constant multipliers as the FFT mode configuration and a size of the filtered current set of samples matches a size of the IFFT in the IFFT mode configuration.

In a third set of embodiments, a receiver device includes a conversion module and a filter module. The conversion module is configured in an FFT mode to convert to the frequency domain a current set of samples of one polarization, where the FFT mode configuration has constant multipliers and a size of the current set of samples matches a size of the FFT in the FFT mode configuration. The filter module is configured to filter the converted current set of samples to compensate for chromatic dispersion in an optical path. The conversion module may also be configured in an IFFT mode to convert to the time domain the filtered current set of samples, where the IFFT mode configuration has the same constant multipliers as the FFT mode configuration and a size of the filtered current set of samples matches a size of the IFFT in the IFFT mode configuration.

BRIEF DESCRIPTION OF THE DRAWINGS

A further understanding of the nature and advantages of embodiments of the present disclosure may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
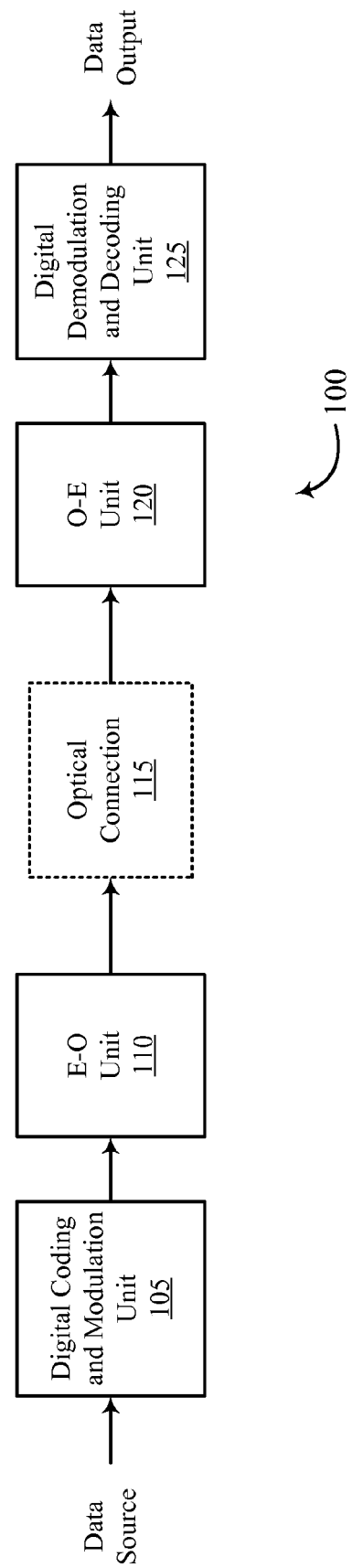
FIG. 1 is a block diagram of an example of an optical communication system including components configured according to various embodiments of the principles described herein.

Methods, systems, and devices are described for filtering data from an optical signal to compensate for chromatic dispersion in an optical path. Samples of different polarizations are filtered in the frequency domain with a matched filter by time-sharing a conversion module. The conversion module first converts a set of samples to the frequency domain for filtering when in a Fast Fourier Transform (FFT) configuration and then converts the filtered set of samples back to the time domain when in an Inverse FFT (IFFT) configuration. The size of the FFT in the FFT configuration and of the IFFT in the IFFT configuration is the same as the size of the samples being processed by the conversion module to enable both configurations to be based on a pipelined configuration with a set of constant multipliers to sequentially process the samples in an efficient manner.

Chromatic dispersion is a type of distortion phenomena in which the group velocity of a wave in an optical medium depends on the frequency of the wave. In fiber optic systems, chromatic dispersion may cause inter-symbol interference because wavelengths of different colors travel at different speeds, which tends to broaden the received signal. In long-distance applications (e.g., metro and long-haul networks), the symbol delay caused by chromatic dispersion may limit the data transmission capabilities of a fiber optic system. For example, for 3,300 kilometers, the symbol delay is approximately 800 symbols between the fastest and slowest wavelengths. Compensation techniques based on time-domain equalization may not be able to handle such a long delay and techniques based on frequency-domain filtering may be used instead. Compensating for chromatic dispersion in a coherent receiver operating at high data rates, such as 40 Gigabit-per-second (Gbps), 100 Gbps, or 200 Gbps, for example, may be a complicated and power-hungry operation, which may impact the overall complexity of the coherent receiver design. However, a low power, low complexity chromatic dispersion compensation approach may be implemented by time-sharing a module used for converting samples to/from the frequency domain for filtering, and by having the module implement both FFT and IFFT calculations based on a pipelined architecture that uses constant multipliers.

This description provides examples, and is not intended to limit the scope, applicability or configuration of embodiments of the principles described herein. Rather, the ensuing description will provide those skilled in the art with an enabling description for implementing embodiments of the principles described herein. Various changes may be made in the function and arrangement of elements.

Thus, various embodiments may omit, substitute, or add various procedures or components as appropriate. For instance, it should be appreciated that the methods may be performed in an order different than that described, and that various steps may be added, omitted or combined. Also, aspects and elements described with respect to certain embodiments may be combined in various other embodiments. It should also be appreciated that the following systems, methods, devices, and software may individually or collectively be components of a larger system, wherein other procedures may take precedence over or otherwise modify their application.

Systems, devices, methods, and software are described for an optical communication system that uses fiber optic cables as a data transmission medium or path. An example of an optical data transport system 100 is illustrated in FIG. 1. In the present example, the optical data transport system 100 includes a digital coding and modulation unit 105, an electrical-to-optical (E-O) unit 110, an optical connection 115, an optical-to-electrical (O-E) unit 120, and a digital demodulation and decoding unit 125. Each of these components may be in communication, directly or indirectly.

In one embodiment, the optical data transport system 100 includes a data source that provides data to a digital coding and modulation unit 105. The data source may include any of a number of common data sources, such as a user telecommunications device, a cable operator head-end unit, a telecommunications provider central office, a computer server, or a network attached storage system, to name but a few examples. In many embodiments, the data source generates significant quantities of data to be transported across the optical data transport system 100. In some instances, the transmission data rate across the optical data transport system 100 may be 40 Gbps or higher. For example, the transmission data rate may be 100 Gbps or as high as 200 Gbps.

The digital coding and modulation unit 105 receives this data, and performs framing, forward error correction coding, and modulation functions on the data. These functions may include using different types of modulation scheme such as Quadrature Phase-Shift Keying (QPSK), 8-PSK, or 16 Quadrature Amplitude Modulation (16-QAM), to name a few. The electrical-to-optical (E-O) unit 110 transforms the data into optical signals, and transmits optical signals containing the data via an optical connection 115. The optical signal produced by the E-O unit 110 may be coherently transmitted to the optical connection 115 by using one or more lasers (not shown), one or more optical components (not shown), and/or one or more electro-optic devices (not shown). The optical connection 115 may include well known components of such connections, including a fiber optic cable. In some embodiments, the optical connection 115 may include any type of medium or path that enables optical signals, or like signals, to propagate. The optical connection 115 may introduce several optical phenomena that may cause phase and/or amplitude distortion. For example, the optical connection 115 may introduce chromatic dispersion, which may result in increased inter-symbol interference in the optical data transport system 100.

An optical-to-electrical (O-E) unit 120 receives the optical signal from the optical connection 115, and transforms the data into the electrical domain. The optical signal received by the E-O unit 120 may be coherently received from the optical connection 115 by using one or more lasers (not shown), one or more optical components (not shown), and/or one or more electro-optic devices (not shown). When coherently received, phase information included in the optical signal is preserved after the O-E unit 120 transforms the data in the optical signal to the electrical domain.

The digital demodulation and decoding unit 125 receives the digitized version of the optical signal and performs demodulation, forward error correction decoding, and de-framing functions on the data from the optical signal. The functions performed by the digital demodulation and decoding unit 125 may also include compensation for chromatic dispersion, which may be done electronically in a coherent receiver because the phase information is preserved in the digitized version of the optical signal. The digital demodulation and decoding unit 125 may then output the data (e.g., to a user telecommunications device, a cable operator head-end unit, a telecommunications provider central office, a computer server, or a network attached storage system).

High-speed digital demodulation and decoding units 125 may typically operate at an analog-to-digital converter (ADC) sample rate of at least twice the symbol rate of the optical signal to achieve acceptable performance levels. However, by including pulse-shaping filters in the digital coding and modulation unit 105 and the digital demodulation and decoding unit 125, at least a portion of the functionality of the digital demodulation and decoding unit 125 may be performed using a sampling rate that is closer to the symbol rate of the optical signal, thereby reducing the complexity and power consumption of the digital demodulation and decoding unit 125. Additionally, by using pulse-shaping filters and DACs during modulation, pre-compensation of non-ideal transmission conditions (e.g., chromatic dispersion) in the optical connection 115 may be performed by circuitry in the digital coding and modulation unit 105. Similarly, by using ADCs and pulse-shaping filters during demodulation, post-compensation of non-ideal transmission conditions (e.g., chromatic dispersion) in the optical connection 115 may be performed by circuitry in the digital demodulation and decoding unit 125.

Figure 2:
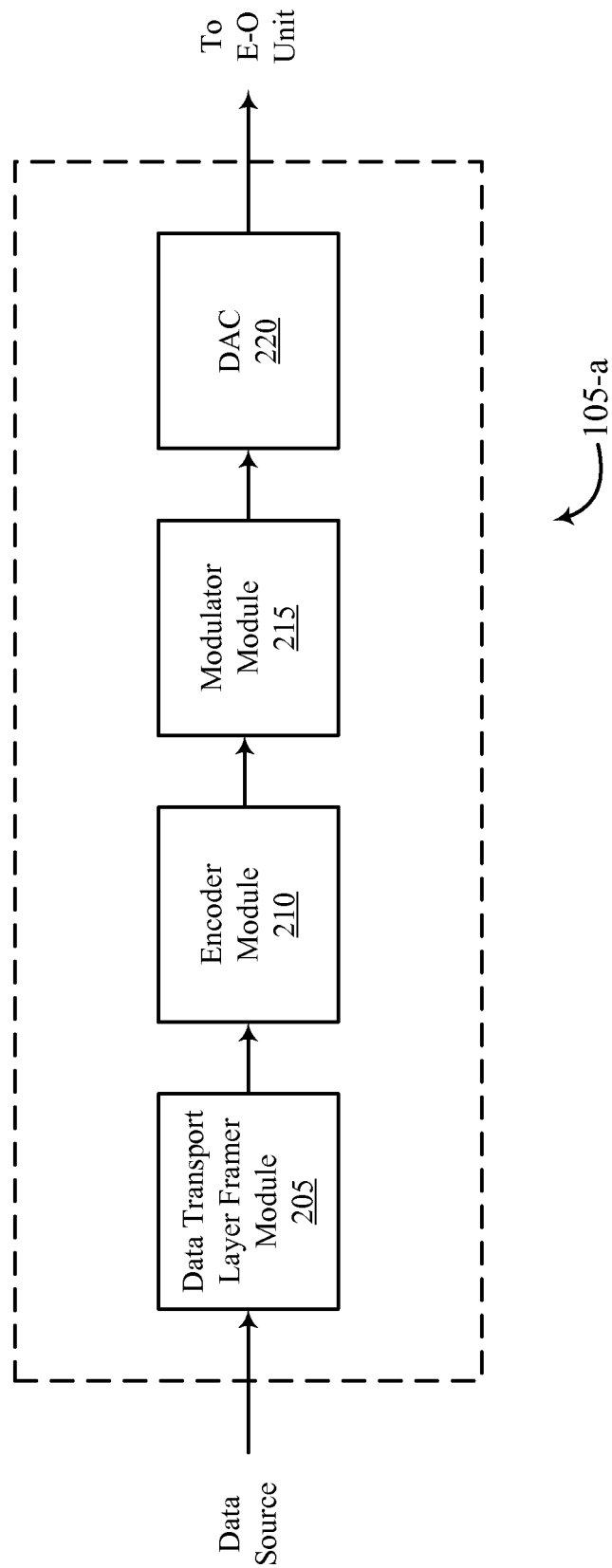
FIG. 2 is a block diagram of an example of a digital coding and modulation module according to various embodiments of the principles described herein.

FIG. 2 illustrates a digital coding and modulation unit 105-*a*. The digital coding and modulation unit 105-*a* may be an example of the digital coding and modulation unit 105 described above with reference to FIG. 1. In the illustrated embodiment, the digital coding and modulation unit 105-*a* includes a data transport layer framer module 205, an encoder module 210, a modulator module 215, and a DAC 220. Each of these components may be in communication, directly or indirectly.

The data transport layer framer module 205 may place the data received from the data source into packet frames for transmission. The packet frames may conform to one of many common protocols for packet frames used in optical communications systems which commonly include a header and a payload, and possibly a trailer, such as a cyclic redundancy check (CRC). As is well understood, the header may be interleaved with the payload during transmission, depending upon the particular protocol being used for optical transmission.

The encoder module 210 may calculate and add forward error correction (FEC) information to the frames of data received from the data transport layer framer module 205. The particular type of FEC information of various embodiments may generally include systematically generated redundant error-correcting code (ECC) data that is transmitted along with the frames. There may be differential encoding used in some embodiments.

The modulator module 215 may perform pulse-shaping and pre-compensation filtering on the frames and FEC information, and modulate the frames and FEC information onto one or more sinusoidal waves generated in the digital domain, and forward the data to the DAC 220. The DAC 220 may convert the digital signal of the modulated data into an analog signal, which may be forwarded to an E-O unit (e.g., E-O unit 110) for conversion from the electrical domain to the optical domain.

Figure 3:
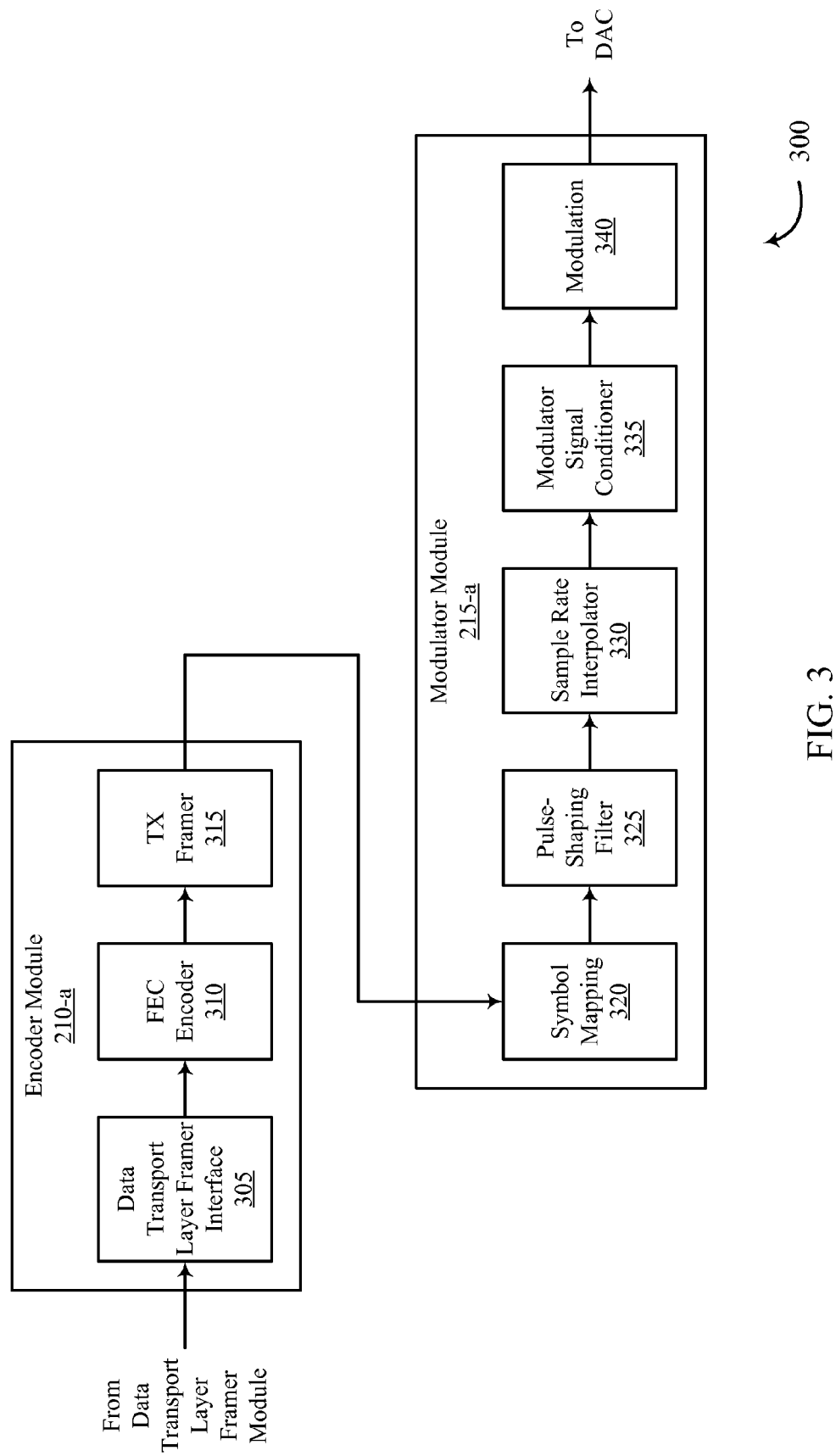
FIG. 3 is a block diagram of an example of an encoder and modulator in a digital coding and modulation module according to various embodiments of the principles described herein.

FIG. 3 illustrates a system 300 that includes an encoder module 210-*a* and a modulator module 215-*a*. Each of these components may be in communication, directly or indirectly. The encoder module 210-*a* and the modulator module 215-*a* may be examples, respectively, of the encoder module 210 and the modulator module 215 described above with reference to FIG. 2.

As shown in FIG. 3, the encoder module 210-*a* includes a data transport layer framer interface module 305, an FEC encoder module 310, and a transmission (TX) framer module 315. The data transport layer framer interface module 305 may receive data to be transmitted from an application or other process external to the encoder 210-*a*. The data received from the data transport layer may be framed as one or more streams of serial bits for transmission.

The data transport layer framer interface module 305 may forward the data for transmission to the FEC encoder module 310. The FEC encoder module 310 may perform forward error correction on the data to be transmitted. The FEC encoder module 310 may support one or more types of forward error correction techniques. For example, the FEC encoder module 310 may support Turbo Product Code (TPC) encoding, which may be used to increase data reliability and reduce the overall bandwidth for transmission of the data. Another type of forward error correction is Low-Density Parity Check (LDPC), which is based on a linear error correction code. The transmission framer module 315 may receive the FEC encoded bits and frame the bits for symbol mapping at the modulator 215-*a*.

The modulator module 215-*a* may include a symbol mapper module 320, a pulse-shaping filter module 325, a sample rate interpolator module 330, a modulator signal conditioner module 335, and a modulation module 340. Each of these components may be in communication, directly or indirectly.

The symbol mapper module 320 may receive the framed, encoded bits from the transmission framer 315 of the encoder and map the bits to modulation symbols according to a particular modulation scheme.

The symbol-mapped bits may then be received at the pulse-shaping filter module 325 in multiples streams. At the pulse-shaping filter module 325, each of the streams may be filtered in the digital domain with at least one pulse-shaping filter. The at least one pulse-shaping filter may include a finite impulse response (FIR) filter or an infinite impulse response (IIR) filter with adjustable tap coefficients. The at least one pulse-shaping filter may be, for example, a root-raised cosine filter or other known pulse-shaping filter that may reduce or adjust the bandwidth associated with the streams symbol-mapped bits. Additionally or alternatively, each stream of symbol-mapped bits may be filtered using an adjustable time and/or frequency domain filter.

Additionally, the pulse-shaping filter module 325 may filter each stream of symbol-mapped bits to pre-compensate for at least one known or predicted non-ideal transmission condition. The non-ideal transmission condition may occur in the optical space, such as chromatic dispersion and/or timing skew that occurs when an optical signal is transmitted through an optical fiber or other optical medium or path. Additionally or alternatively, the non-ideal transmission condition may occur in the electrical domain. For example, the non-ideal transmission condition may include a non-linear amplifier response at the transmitting or receiving end, or component or channel roll-off that occurs in a DAC, an ADC, or another electrical component.

In certain examples, the non-ideal transmission condition may be predicted or determined based on measurements taken at one or more points in the transmitter, the signal path, or the receiver. For example, a receiver may measure a certain degree of chromatic dispersion in a received optical signal and communicate with the transmitter to provide data about the measured chromatic dispersion. Additionally or alternatively, the non-ideal transmission condition may be modeled or estimated based on known properties of electrical and/or optical components in the signal path between the transmitter and the receiver.

The pulse-shaping filter module 325 may pre-compensate for the at least one identified non-ideal transmission condition by calculating or estimating an effect of the non-ideal transmission condition on the transmitted optical signal and filtering the streams of symbol-mapped bits to at least partially reverse, lessen, or compensate the effect of the non-ideal transmission condition(s). In certain examples, separate filters may be used to create the root-raised cosine pulse shape and to pre-compensate for non-ideal transmission conditions. Alternatively, a single digital filter may be used for each stream to both shape the pulses into the desired root-raised cosine shape and to make further adjustments to the shape of the pulses to pre-compensate for the non-ideal transmission conditions.

The pulse-shaping filter(s) of the pulse-shaping filter module 325 may be dynamically tunable through the use of changeable filter tap coefficients. In certain examples, the type of filter itself may be dynamically changed to pre-compensate for a non-ideal transmission condition. For example, one or more filters in the pulse-shaping filter module 325 may be dynamically changed from a root-raised cosine filter to a simple raised-cosine filter, a Gaussian filter, or a sinc-shaped filter if such a change would more effectively pre-compensate for a known or predicted non-ideal transmission condition.

Additionally, in certain examples it may be possible to dynamically customize the filtering performed at each stream of symbol-mapped bits. For example, when the symbol mapper module 320 produces HI, HQ, VI, and VQ streams, it may be determined that an optical transmission path introduces a timing skew between the HI and HQ streams, but not between the VI and VQ streams. In this example, the properties of a pulse-shaping filter associated with the HI and/or HQ streams may be adjusted to pre-compensate for the timing skew without making adjustments to the VI and VQ streams.

The output of the pulse-shaping filter module 325 may be received at the sample rate interpolator module 330. The sample rate interpolator module 330 may add bits to each of the streams of symbol-mapped bits to increase the sample rate of each stream, for example, to twice the symbol rate. The modulator signal conditioner module 335 may receive the output of the sample rate interpolator module 330 and may perform additional filtering on each of the streams in the digital domain. For example, the modulator signal conditioner module 335 may perform direct current (DC) bias compensation. Additionally or alternatively, the modulator signal conditioner module 335 may filter the streams to compensate for amplitude/amplitude (AM/AM) non-linearity caused by driving amplifiers into saturation and/or amplitude/phase non-linearity. The modulator signal conditioner module 335 may include tunable digital domain filters that may be dynamically adjusted as changes in DC bias or amplifier non-linearity are detected, predicted, or determined. In some embodiments, some or all of the functionality of the modulator signal conditioner module 335 is performed at the phase-shaping filter module 325.

The output of the modulator signal conditioner module 335 may be received by the modulation module 340. The modulation module 340 may generate sinusoidal waves or waveforms in the digital domain and modulate the filtered, up-sampled, and conditioned symbol-mapped bits that are output by the modulator signal conditioner module 335 onto the sinusoidal waveforms. In certain examples, the sinusoidal waveforms may have a relatively low intermediate frequency.

The modulated waves may be output by the modulation module 340 to one or more DACs (not shown), which may convert each modulated carrier wave from the digital domain to the analog domain. The waveforms in the analog domain that are output by the DAC(s) may undergo amplification and additional conditioning. When H and V polarizations are used, the amplified and conditioned waveforms may be converted into separate H and V optical signals at an E-O unit (not shown).

Figure 4:
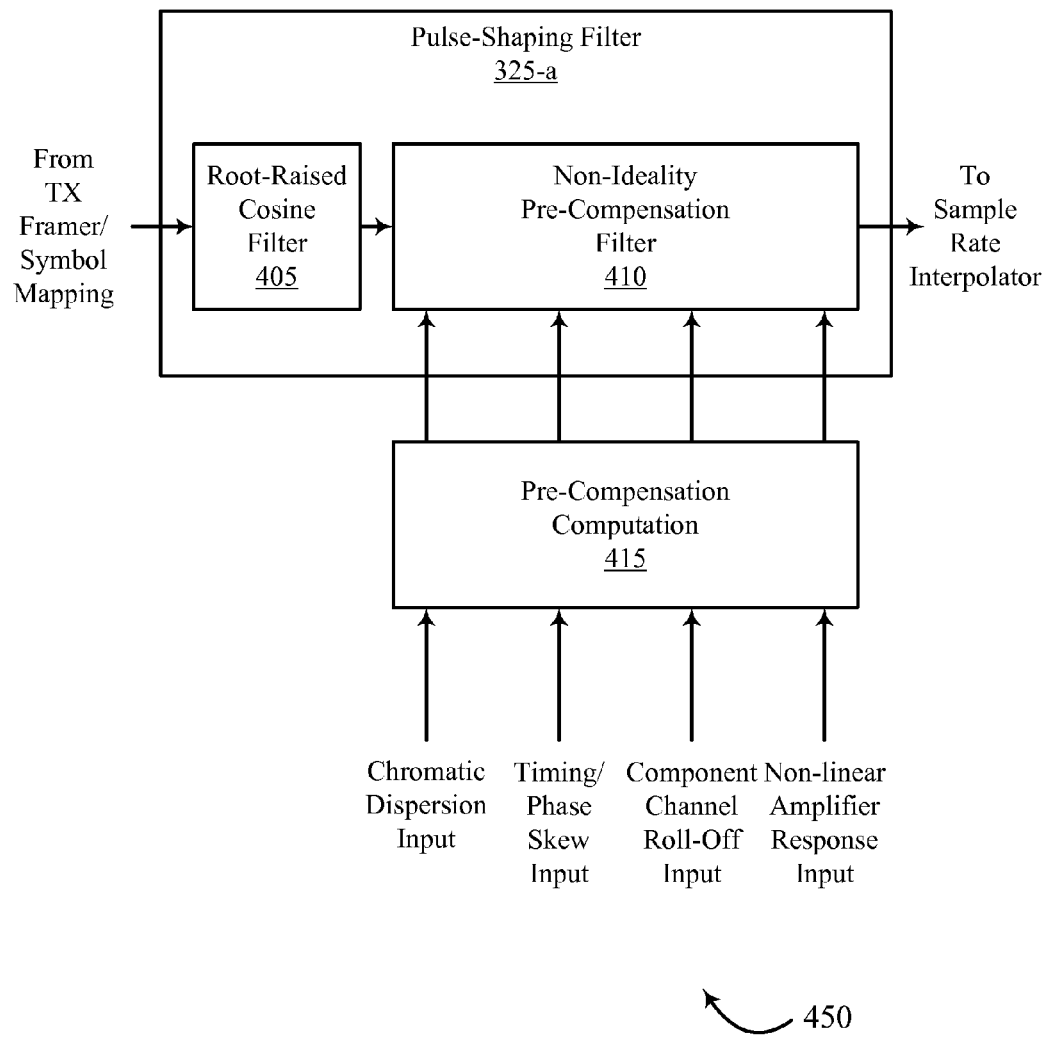
FIG. 4 is a block diagram of an example of a pulse shaping filter module according to various embodiments of the principles described herein.

FIG. 4, a system 450 is shown in which a pulse-shaping filter module 325-a is coupled to a pre-compensation computation module 415. The pulse-shaping filter module 325-a may be an example of the pulse-shaping filter module 325 described above with reference to FIG. 3.

The pulse-shaping filter module 325-a may include a root-raised cosine filter module 405 and a non-ideality pre-compensation filter module 410. The root-raised cosine filter module 405 may filter incoming streams of symbol-mapped bits (e.g., pulses of high and low voltages) to form the bits into a root-raised cosine shape. This root-raised cosine filter module 405 may reduce the bandwidth of the streams, thereby reducing inter-symbol interference. Additionally or alternatively, other types of pulse-shaping filters may be used, including, but not limited to, boxcar filters, sinc filters, raised-cosine filters, Gaussian filters, and the like.

The non-ideality pre-compensation filter module 410 may filter the streams of symbol-mapped bits in the digital domain to compensate for one or more predicted, determined, or known non-ideal transmission conditions. The non-ideality pre-compensation filter module 410 may receive input regarding chromatic dispersion in the signal path, input regarding timing phase or skew occurring in the signal path, input regarding component channel roll-off in the transmitter or receiver, and input regarding non-linear amplifier response in either the transmitter or the receiver. In other embodiments, input regarding more or fewer non-ideal transmission conditions may be received at the non-ideality pre-compensation filter module 410.

The input received by non-ideality pre-compensation filter module 410 may be used to generate a filtering function in the digital domain which is substantially inverse to a measured, a determined, or a predicted effect of the non-ideal transmission condition(s) to mitigate the detrimental effects of the identified non-ideal transmission conditions. In certain examples, the substantially inverse filtering functions may be pre-programmed or retrievable in memory. Additionally or alternatively, the input may include filter tap coefficients that weight certain aspects of one or more pulse-shaping filters to pre-compensate for the identified non-ideal transmission condition(s). The input may be received directly from an external application or process or statically stored in a register. In certain examples, the input may include active feedback and/or measurements received by one or more components within the signal path of the optical signal. For example, a first device may transmit an optical signal to a second device, and the second device may measure one or more non-ideal transmission conditions based on the received optical signal and transmit the measurements or other feedback based on the measurements back to the first device.

In certain examples, the root-raised cosine filter module 405 and the non-ideality pre-compensation filter module 410 may be implemented by a single discrete filter for each stream of symbol-mapped bits. Alternatively, the symbol-mapped bits may be sequentially filtered by a root-raised cosine filter and a non-ideality pre-compensation filter. In certain examples, the order in which each stream undergoes root-raised cosine filtering and non-ideality pre-compensation filtering may vary. In certain examples, the order of filtering may be dynamically modified to achieve a most favorable result. Moreover, in certain examples, a first stream (e.g., HI stream) of symbol-mapped bits may be passed through root-raised cosine filtering and non-ideality pre-compensation filtering in a different order than a second stream (e.g., VQ stream) of symbol-mapped bits.

The pre-compensation computation module 415 may receive input from an external application, process, or device and/or from one or more registers storing saved or default input regarding non-ideal transmission conditions. The input may be used by the pre-compensation computation module 415 to compute a set of filter tap coefficient values for a discrete pulse-shaping filter implementing at least the non-ideality pre-compensation filter module 410. In certain examples, the pre-compensation computation module 415 may compute the filter tap coefficient values based on a weighted consideration of the totality of the received input. Additionally or alternatively, the pre-compensation computation module 415 may compute the filter tap coefficient values based on a one-to-one correlation between non-ideal transmission conditions and filter tap coefficient values.

Figure 5:
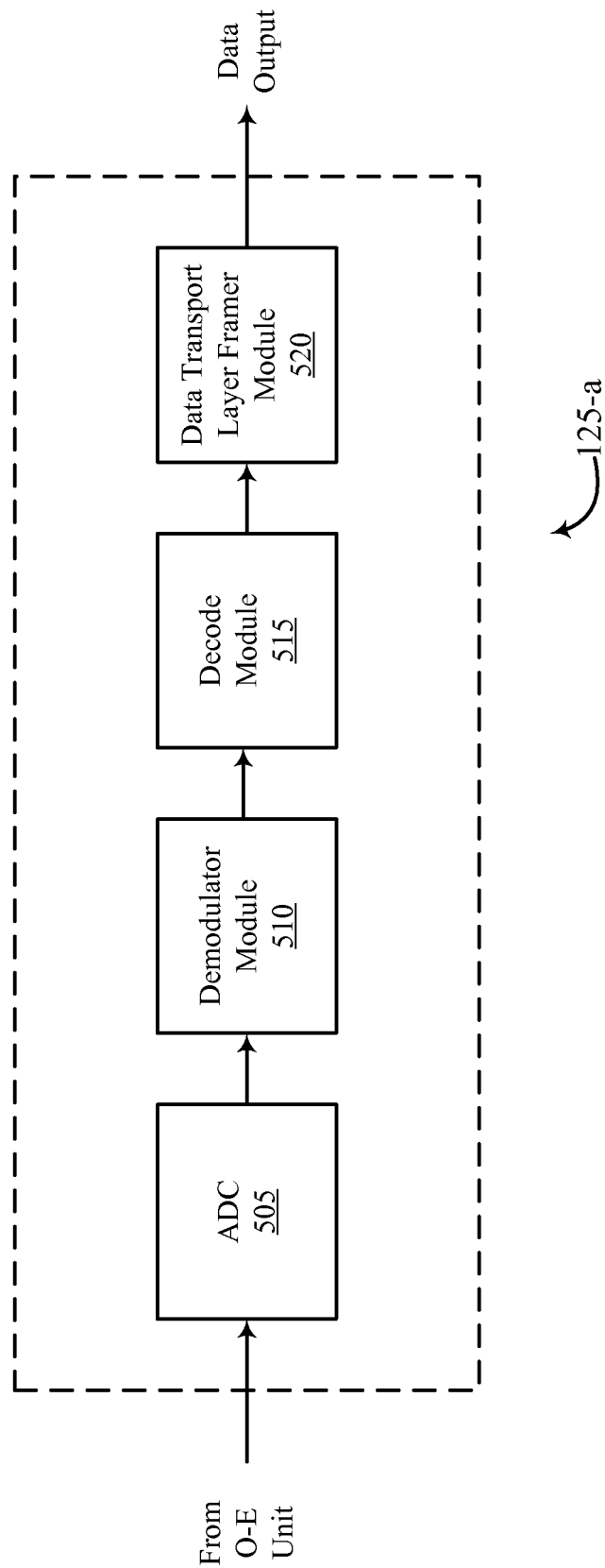
FIG. 5 is a block diagram of an example of a digital demodulation and decoding module according to various embodiments of the principles described herein.

As illustrated in FIG. 5, an example of a digital demodulation and decoding unit 125-a is shown. The digital demodulation and decoding unit 125-a may be an example of the digital demodulation and decoding unit 125 described above with reference to FIG. 1. In this embodiment, the digital demodulation and decoding unit 125-a includes an ADC 505, a demodulator module 510, a decoder module 515, and a data transport layer framer module 520. Each of these components may be in communication, directly or indirectly.

The ADC 505 may sample an electrical and analog version of an optical and analog signal received by an O-E unit (not shown). The optical signal from the E-O unit may have been transmitted at a data transmission rate of 40 Gbps, 100 Gbps, or 200 Gbps, for example. Moreover, the optical signal may have been coherently transmitted to include phase information in the optical signal. The ADC 505 may provide a digitally sampled version of the optical/analog signal to the demodulator module 510, which demodulates the digitally-sampled signal and provides the demodulated data to the decoder module 515. The demodulator module 510 may also compensate for non-ideal transmission conditions, including chromatic dispersion. For example, the demodulator module 510 may use a frequency-domain filtering technique to compensate for chromatic dispersion introduced by an optical medium. The frequency-domain filtering technique may be based on a filter that is matched to a filter in the modulator of the device transmitting the optical signals. Moreover, the frequency-domain filtering technique may be implemented by time-sharing a module used for converting samples to/from the frequency domain for filtering, and by having the module implement both FFT and IFFT calculations based on a pipelined architecture that uses constant multipliers.

The decoder module 515 performs FEC decoding on the demodulated data, and may correct transmission errors identified from error-correcting code. The decoder module 515 provides the decoded and corrected data to the data transport layer framer module 520, which frames (or de-frames) the data from the signal according to the particular protocol used in the optical transmission, and provides output data. The data may be output to, for example, a user or any receiving system.

Figure 6:
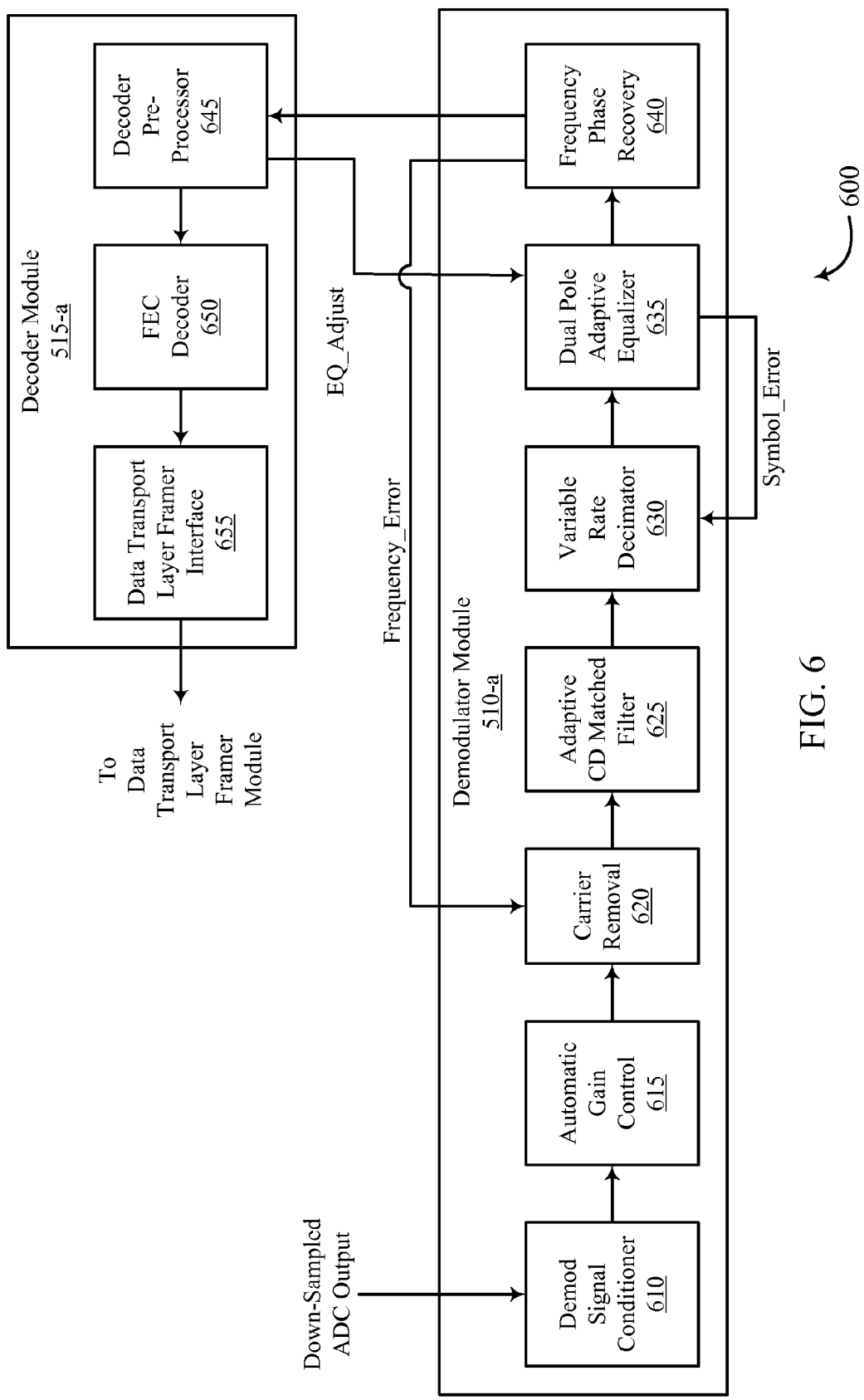
FIG. 6 is a block diagram of an example of a demodulator and decoder according to various embodiments of the principles described herein.

FIG. 6 is a block diagram of a system 600 that includes a demodulator module 510-a and a decoder module 515-a. Each of these components may be in communication, directly or indirectly. The demodulator module 510-a and the decoder module 515-a may be respective examples of the demodulator module 510 and the decoder module 515 described above with reference to FIG. 5.

The demodulator 510-a may include a demodulator signal conditioner module 610, an automatic gain control module 615, a carrier removal module 620, an adaptive chromatic dispersion (CD) matched filter module 625, a variable rate decimator 630, a dual pole adaptive equalizer module 635, and a frequency phase recovery module 640.

Through the use of pulse-shaping to reduce inter-symbol interference and the effects of non-ideal transmission conditions, it may be possible to perform some of the filtering and other preliminary demodulation steps on a version of the optical signal that is sampled at or near the baud rate (e.g., the symbol rate) of the optical signal. However, an ADC that samples the optical signal at a rate of twice the symbol rate may be more readily obtainable and less expensive than an ADC that samples at or near the baud rate of the optical signal. Therefore, in some embodiments, an ADC that samples at twice the symbol rate may be used, and the output of the ADC may be down-sampled to just over the baud rate of the optical signal (e.g., between 1.0 and 1.3 times the baud rate).

The demodulator signal conditioner module 610 may receive the down-sampled version from the ADC and perform preliminary filtering on the received sampled version of the optical signal. The automatic gain control module 615 may automatically adjust the gain of the down-sampled version of the optical signal to bring the amplitude of the modulated carrier wave into an acceptable range. The carrier removal module 620 may then extract the symbol-mapped bits from the carrier frequency according to the modulation scheme used in the optical signal.

The adaptive CD matched filter 625 may filter the symbol-mapped bits to compensate for chromatic dispersion in the optical transmission path. In certain examples, the adaptive CD matched filter 625 may match one or more filters in the modulator of the device transmitting the optical signals. In certain examples, the adaptive CD matched filter 625 may convert to the frequency domain a current set of samples of one polarization using a module configured in an FFT mode, where the FFT mode configuration has constant multipliers and a size of the current set of samples matches a size of the FFT in the FFT mode configuration. The adaptive CD matched filter 625 may then filter the converted current set of samples to compensate for chromatic dispersion in an optical path. The adaptive CD matched filter 625 may convert the filtered current set of samples to the time domain using the module configured in an IFFT mode, where the IFFT mode configuration has the same constant multipliers as the FFT mode configuration and a size of the filtered current set of samples matches a size of the IFFT in the IFFT mode configuration. The adaptive CD matched filter 625 may time share the module to process samples of a different polarization along with the current set of samples.

The variable rate decimator module 630 may adjust the sampling rate of the symbol-mapped bits such that each stream of symbol-mapped bits is at a sampling rate that will allow for minimal inter-symbol interference during equalization. In certain cases, the variable rate decimator module 630 may up-sample the extracted and filtered symbol-mapped bits to the original sample rate of the ADC (e.g., twice the symbol rate). The dual pole adaptive equalizer module 635 performs additional filtering on the streams of symbol-mapped bits in the digital domain to reduce inter-symbol interference and allow for the recovery of the modulated data. The dual pole adaptive equalizer module 635 may perform an inverse or matched filtering function of one or more pulse-shaping filters in the transmitter. The dual pole adaptive equalizer module 635 may be configured to support one or more polarizations in the modulation scheme. After equalization is performed, the frequency phase recovery module 640 may recover the encoded bits based on symbols representing changes in the phase of the modulated carrier frequency. The encoded bits may be recovered from the symbols using information about the constellation diagram that is representative of the modulation scheme used to transmit the optical signal. In some embodiments, additional or separate modules may be used as appropriate to demodulate the encoded data from the recovered symbols.

The decoder module 515-a of the present example includes a decoder pre-processor module 645, an FEC decoder module 650, and a data transport layer framer interface module 655. Each of these components may be in communication, directly or indirectly.

The decoder pre-processor module 645 may enforce a set of rules to ensure the integrity and validity of the encoded data received from the demodulator module 510-a. The FEC decoder module 650 may perform forward error correction on the encoded bits to identify and correct errors and reconstruct the originally transmitted stream of data. The FEC decoder module 650 may support one or more decoding techniques such as TPC decoding and LDPC decoding, for example. The data transport layer framer interface 655 may forward the originally transmitted stream of data to a data transport layer framer for processing and delivery.

Figure 7:
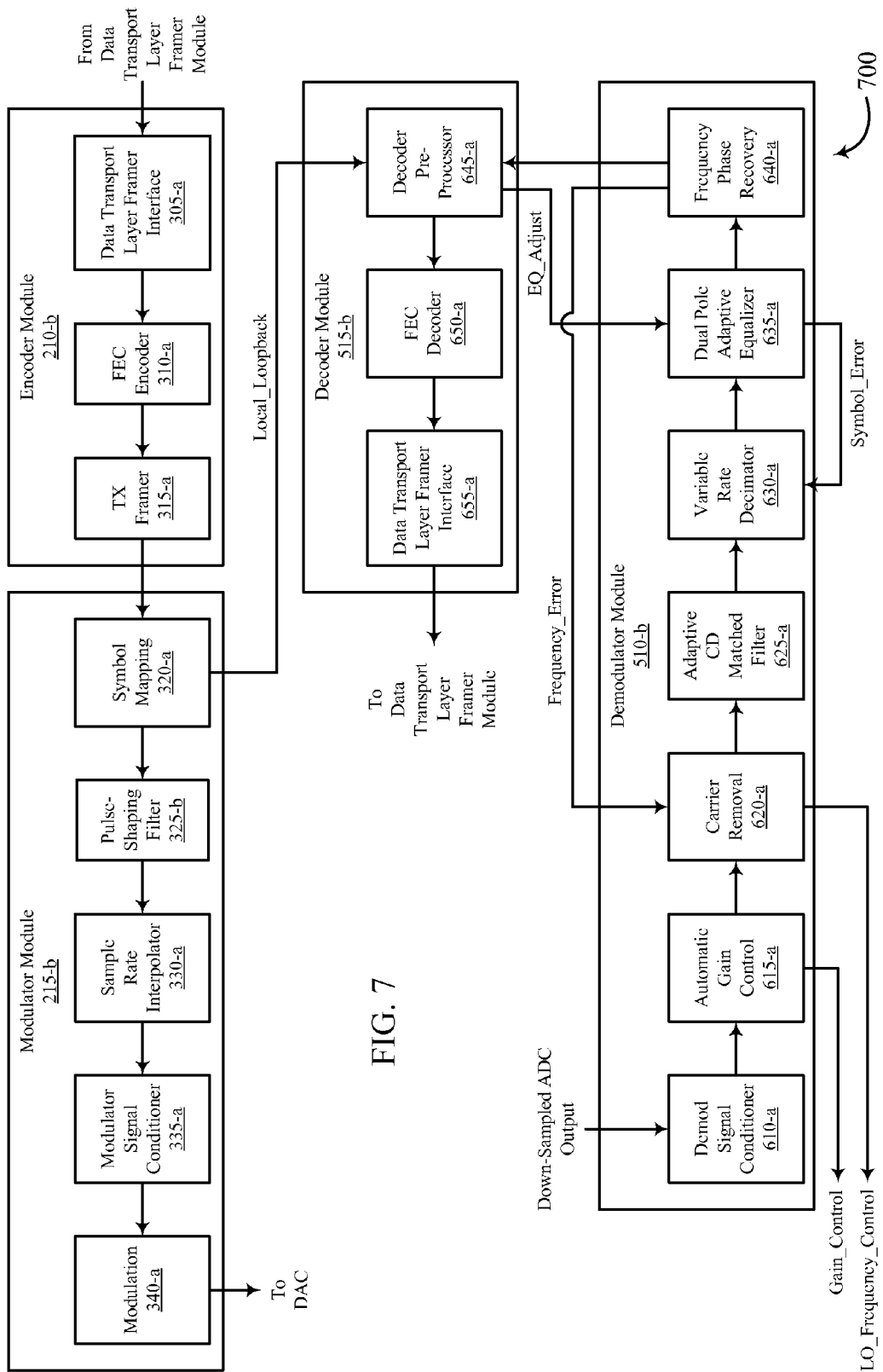
FIG. 7 is a block diagram of an example of an optical modem according to various embodiments of the principles described herein.

FIG. 7 illustrates a block diagram of an example of a modem device 700. The modem 700 includes an encoder module 210-b, a modulator module 215-b, a demodulator module 510-b, and a decoder module 515-b. The encoder module 210-b may be an example of the encoder modules 210 and 210-a described above with reference to FIG. 2 and FIG. 3, respectively. The modulator module 215-b may be an example of the modulator modules 215 and 215-a described above with reference to FIG. 2 and FIG. 3, respectively. The demodulator module 510-b may be an example of the demodulator modules 510 and 510-a described above with reference to FIG. 5 and FIG. 6, respectively. The decoder module 515-b may be an example of the decoder modules 515 and 515-a described above with reference to FIG. 5 and FIG. 6, respectively.

The encoder module 210-b may include a data transport layer framer interface module 305-a, an FEC encoder module 310-a, and a TX framer module 315-a. These components may be examples of the data transport layer framer interface module 305, the FEC encoder module 310, and the TX framer module 315 described above with reference to FIG. 3. The modulator module 215-b may include a symbol mapper module 320-a, a pulse-shaping filter module 325-b, a sample rate interpolator module 330-a, a modulator signal conditioner module 335-a, and a modulation module 340-a. These components may be examples of the symbol mapper module 320, the pulse-shaping filter module 325, the sample rate interpolator module 330, the modulator signal conditioner 335, and the modulation module described above with reference to FIG. 3. Additionally, the pulse-shaping filter 325-b may be an example of the pulse-shaping filter 325-a described above with reference to FIG. 4.

The demodulator module 510-b of the example in FIG. 7 may include a demodulator signal conditioner module 610-a, an automatic gain control module 615-a, a carrier removal module 620-a, an adaptive CD matched filter module 625-a, a variable rate decimator module 630-a, a dual pole adaptive equalizer module 635-a, and a frequency phase recovery module 640-a. These components may be examples of the demodulator signal conditioner module 610, the automatic gain control module 615, the carrier removal module 620, the adaptive CD matched filter module 625, the variable rate decimator module 630, the dual pole adaptive equalizer module 635, and the frequency phase recovery module 640 described above with reference to FIG. 6.

The decoder module 515-b may include a decoder pre-processor module 645-a, an FEC decoder module 650-a, and a data transport layer framer interface 655-a. These components may be examples of the decoder pre-processor module 645, the FEC decoder module 650, and the data transport layer framer interface module 655 described above with reference to FIG. 6.

As shown in FIG. 7, components of the modulator module 215-b, the decoder module 515-b, and the demodulator module 510-b may interact with each other. For example, the symbol mapper module 320-a of the modulator module 215-b may provide local loopback feedback signal (Local Loopback) to the decoder pre-processor module 645-a to increase the accuracy of the decoder pre-processor module 645-a. The decoder pre-processor module 645-a may provide an equalizer adjustment feedback signal (EQ_Adjust) to the dual pole adaptive equalizer 635-a of the demodulator 510-b to dynamically adjust the equalization filtering at the demodulator module 510-c.

The frequency phase recovery module 640-a of the demodulator module 510-b may provide a frequency error signal (Frequency_Error) to the carrier removal module 620-a to allow the carrier removal module 620-a to achieve frequency lock with the carrier frequency. The dual pole adaptive equalizer module 635-a may provide a symbol error feedback signal (Symbol_Error) to the variable rate decimator module 630-a to allow the variable rate decimator module 630-a to dynamically adjust the sampling rate and reduce inter-symbol interference. The carrier removal module 620-a may provide a local oscillator frequency control signal (LO_Frequency_Control) to correct the frequency of a local oscillator signal that is used to demodulate the received optical signal. Additionally, the automatic gain control 615-a may provide a gain control signal (Gain_Control) that is based on the gain being applied to the amplitude of the modulated carrier wave.

Figure 8:
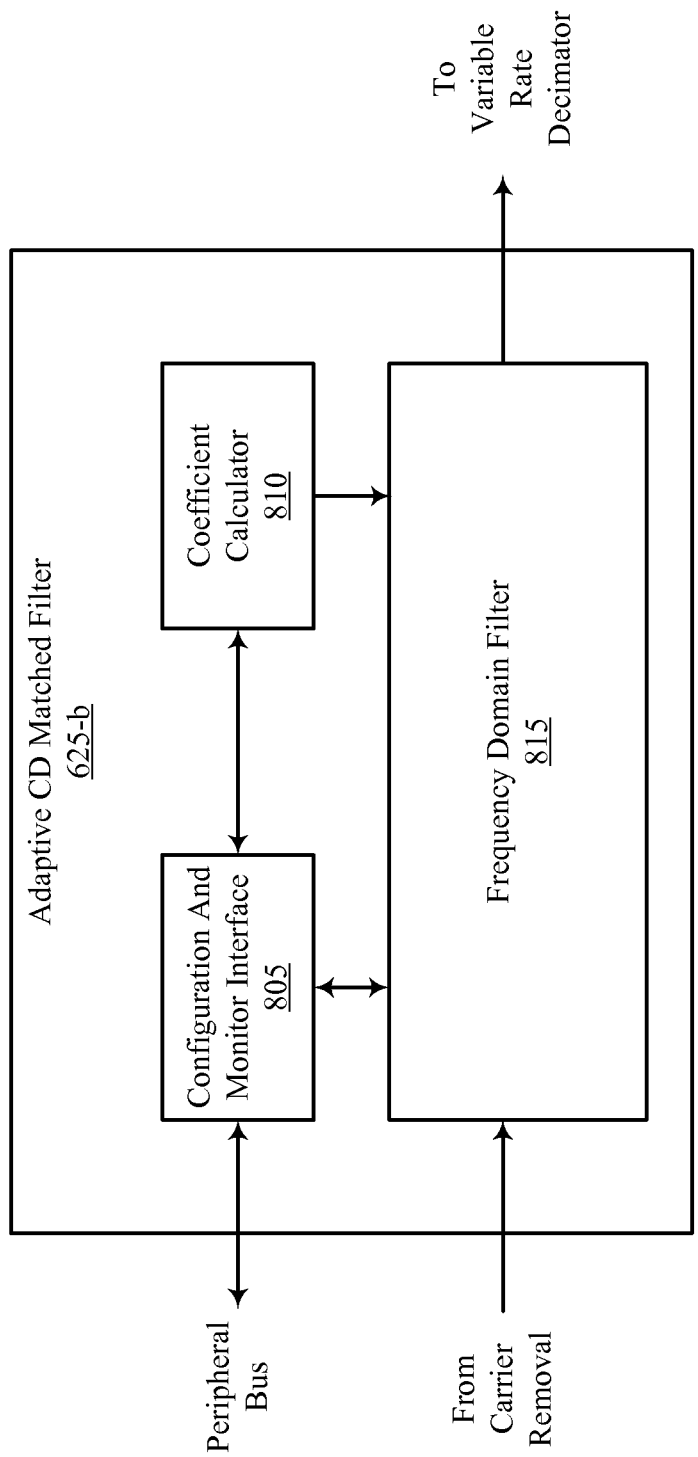
FIG. 8 is a block diagram of an example of an adaptive chromatic dispersion matched filter according to various embodiments of the principles described herein.

As illustrated in FIG. 8, an adaptive CD matched filter 625-b is shown. The adaptive CD matched filter 625-b may be an example of the adaptive CD matched filters 625 and 625-a described above with reference to FIG. 6 and FIG. 7, respectively. In the illustrated embodiment, the adaptive CD matched filter 625-b includes a configuration and monitor interface 805, a coefficient calculator 810, and a frequency domain filter 815. Each of these components may be in communication, directly or indirectly.

The configuration and monitor interface 805 interacts with a peripheral bus to obtain information with which to configure and/or control at least some of the functions of the coefficient calculator 810 and the frequency domain filter 815. The configuration and monitor interface 805 may also monitor the conversion operations of the frequency domain filter 815, and may provide some of the monitored information out to the peripheral bus.

The coefficient calculator 810 calculates the filter coefficients used by the frequency domain filter 815 to perform filtering operations that compensate for chromatic dispersion. The coefficient calculator 810 may dynamically compute a set of filter coefficients (e.g., filter taps) based on different parameters corresponding to the optical communication path (e.g., optical connection 115) and/or based on characteristics or physical properties of the optical communication system (e.g., optical data transport system 100). For example, the coefficient calculator 810 may compute a set of filter coefficients based on one or more of a length of an optical fiber used in the fiber optic system, a symbol rate, a group delay corresponding to the optical fiber, an optical wavelength, and the speed of light. In certain examples, the filtering performed by the frequency domain filter 815 may be based on a filter that uses a symmetric set of filter coefficients. In such instances, the coefficient calculator 810 need only compute one half of the filter coefficients, with the other half of the filter coefficients computed by mirroring the first half.

The frequency domain filter 815 is based on a time-shared architecture that may concurrently process samples (e.g., in-phase samples, quadrature samples) from different polarizations (e.g., horizontal polarization, vertical polarization). The frequency domain filter 815 converts to the frequency domain a current set of samples of one polarization using a module (not shown) configured in an FFT mode. The current set of samples may be generated or obtained from data included in one or more coherently received optical signals. The FFT mode configuration is able to use a pipelined architecture with constant multipliers by having a size of the current set of samples (e.g., number of samples in the set) match a size of the FFT in the FFT mode configuration (e.g., number of points in the FFT algorithm). The frequency domain filter 815 filters the converted current set of samples to compensate for chromatic dispersion in an optical path. The frequency domain filter 815 then converts to the time domain the filtered current set of samples using the module configured in an IFFT mode. The IFFT mode configuration is able to use a pipelined architecture with the same constant multipliers as the FFT mode configuration by having a size of the filtered current set of samples (e.g., number of samples in the set) match a size of the IFFT in the IFFT mode configuration (e.g., number of points in the IFFT algorithm). In some embodiments, the size of the FFT or IFFT may be chosen to be four times the parallelism that may be needed to process one polarization. This approach may allow the frequency domain filter 815 to be used in a time-shared fashion to process FFT for H and V polarizations and IFFT for H and V polarizations and to turn the multipliers used in the FFT/IFFT to constant multipliers rather than true multipliers.

The time-shared architecture of the frequency domain filter 815 may allow the filtering of the converted current set of samples to take place while converting to the frequency domain a next set of samples of a different polarization using the module in the FFT mode. The frequency domain filter 815 may then convert to the time domain the filtered current set of samples using the module in the IFFT mode while filtering the converted next set of samples to compensate for chromatic dispersion in the optical path. The frequency domain filter 815 may later convert to the time domain the filtered next set of samples using the module in the IFFT mode.

To generate different sets of samples for processing and to match the size of the sets of samples to the size of the FFT/IFFT, the frequency domain filter 815 may buffer samples of different polarizations separately. Buffering also allows for proper time-sharing scheduling by having a buffered set of samples of one polarization delayed with respect to a buffered set of samples of another polarization.

In some embodiments, the frequency domain filter 815 includes a matched filter (not shown) that may be dynamically adjustable for a wide range of equalization needs. The coefficient calculator 810 may provide the filter coefficients that are used to adjust the matched filter.

Figure 9A:
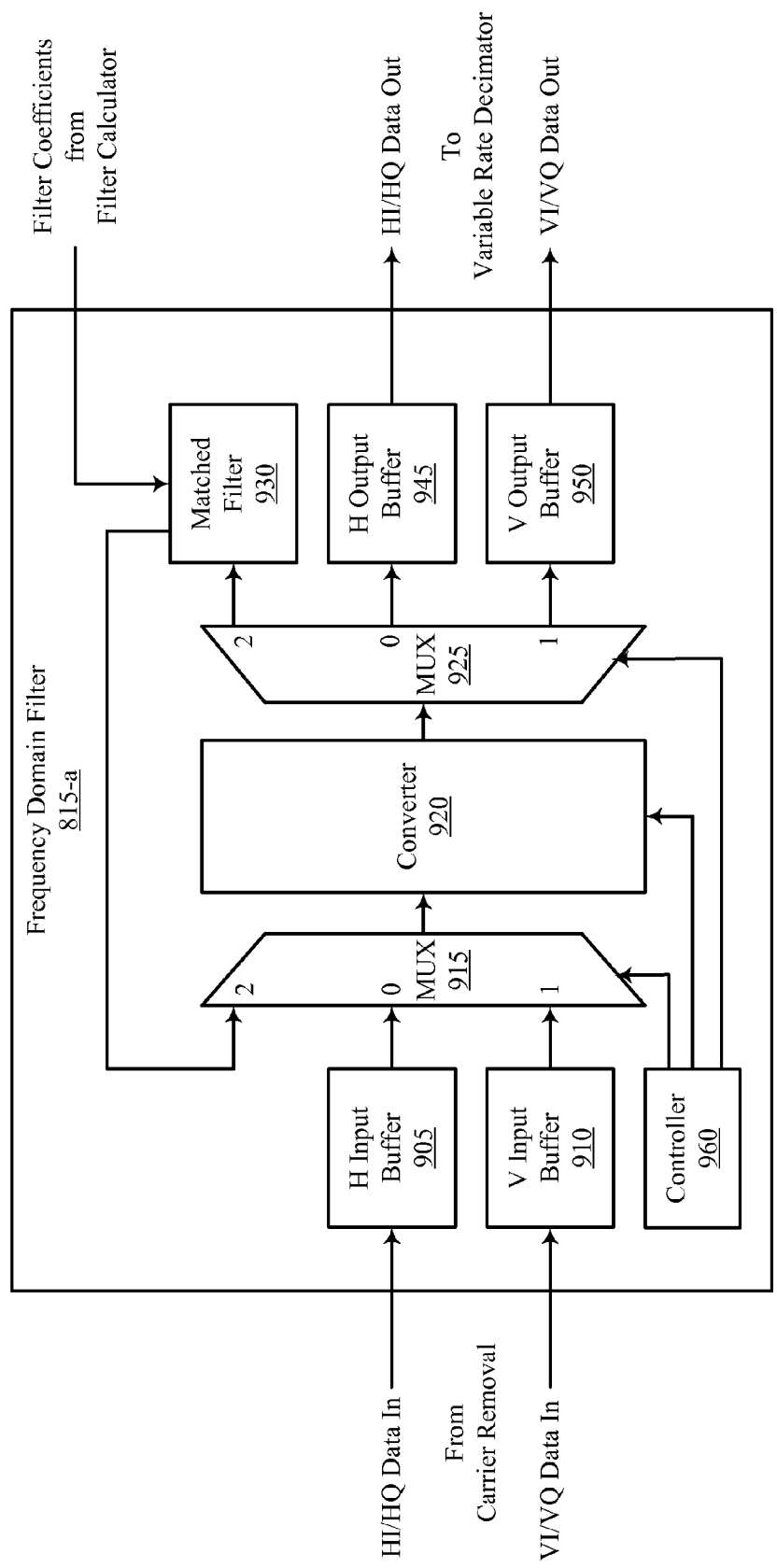
FIG. 9A is a block diagram of an example of a frequency domain filter according to various embodiments of the principles described herein.

FIG. 9A illustrates a frequency domain filter 815-a. The frequency domain filter 815-a may be an example of the frequency domain filter 815 described above with reference to FIG. 8. In the illustrated embodiment, the frequency domain filter 815-a includes a horizontal polarization (H) input buffer 905, a vertical polarization (V) input buffer 910, a multiplexer (MUX) 915, a converter 920, a MUX 925, a matched filter 930, a horizontal polarization (H) output buffer 945, a vertical polarization (V) output buffer 950, and a controller 960. Each of these components may be in communication, directly or indirectly.

The H input buffer 905 receives in-phase (HI) and quadrature (HQ) data samples and buffers the samples before providing the buffered samples to input "0" of the MUX 915. The V input buffer 910 receives in-phase (VI) and quadrature (VQ) data samples and buffers the samples before providing the buffered samples to input "1" of the MUX 915. In certain examples, each of the H input buffer 905 and the V input buffer 910 may receive 128 (I/Q) samples/clock, which are buffered over several clocks to produce a 1024-sample output. In certain examples, because of sample overlap, the 1024-sample output may be generated with four (4) clocks of new data instead of eight (8) clocks of new data.

The converter 920 converts a set of samples provided by the MUX 915 from the time domain to the frequency domain when configured in an FFT mode. The set of samples for conversion to the frequency domain are received by the converter 920 from the output of the H input buffer 905 (input "0" of the MUX 915) or from the output of the V input buffer 910 (input "1" of the MUX 915). Alternatively, the converter 920 converts a set of samples provided by the MUX 915 from the frequency domain to the time domain when configured in an IFFT mode. The set of samples for conversion to the time domain are received by the converter 920 from the output of the matched filter 930 (input "2" of the MUX 915).

The matched filter 930 receives the converted set of samples produced by the converter 920 from the MUX 925 (output "2" of the MUX 925). The matched filter 930 then filters the converted set of samples to compensate for chromatic dispersion and provides the filtered set of samples back to the converter 920 through the MUX 915 for subsequent conversion to the time domain.

The H output buffer 945 receives a set of samples from the converter 920 through output "0" of the MUX 925 after the samples have been converted back to the time domain by the converter 920 subsequent to filtering by the matched filter 930. The H output buffer 945 buffers the samples before providing the buffered samples as in-phase (HI) and quadrature (HQ) output data. The V output buffer 950 receives a set of samples from the converter 920 through output "1" of the MUX 925 after the samples have been converted back to the time domain by the converter 920 subsequent to filtering by the matched filter 930. The V output buffer 950 buffers the samples before providing the buffered samples as in-phase (VI) and quadrature (VQ) output data.

The controller 960 controls the MUX 915 to provide the appropriate input to the converter 920 for time-to-frequency domain conversion or for frequency-to-time domain conversion according to the time-sharing operation of the frequency domain filter 815-*a*. The controller 960 controls the MUX 925 to provide the output of the converter 920 to the matched filter 930 for filtering or for buffering at the H output buffer 945 or the V output buffer 950. The controller 960 controls the configuration of the converter 920 so the converter 920 is configured in the FFT mode for time-to-frequency domain conversions and is configured in the IFFT mode for frequency-to-time domain conversions.

In certain examples, when the data input to the frequency domain filter 815-*a* is sampled at a rate of 1.2 samples/symbol, the FFT implemented by the converter 920 in the FFT mode is a 1024-point FFT and the IFFT implemented by the converter 920 in the IFFT mode is a 1024-point IFFT. A sample rate of 1.2 samples/symbol (e.g., just over the baud rate of the optical signal) may be obtained by down-sampling an ADC-sampled signal as described above with reference to FIG. 6. By having the size of the FFT and IFFT match the 1024-sample output from each of the H input buffer 905 and V input buffer 910, the multipliers used in the 1024-point FFT and the multipliers used in the 1024-point IFFT may be constant multipliers.

Figure 9B:
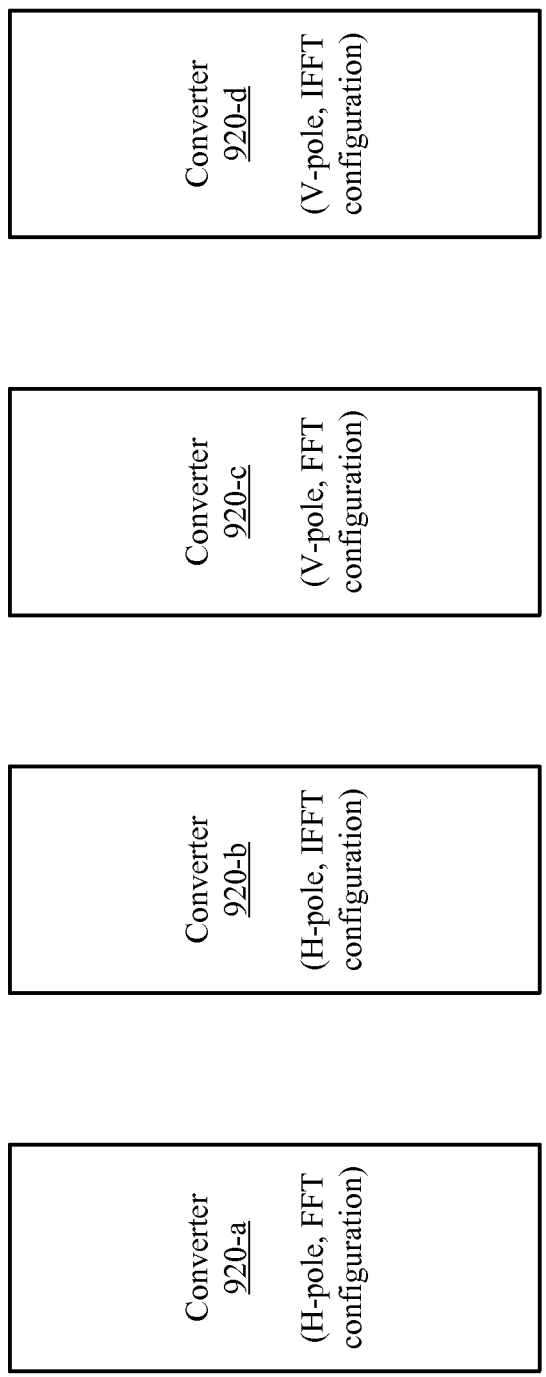
FIG. 9B is a block diagram that illustrates examples of the converter module according to various embodiments of the principles described herein.

In FIG. 9B, there are shown various configurations of the converter 920 of FIG. 9A. For example, a converter 920-*a* corresponds to the converter 920 when configured for H polarization and FFT calculations, the converter 920-*b* corresponds to the converter 920 when configured for H polarization and IFFT calculations, the converter 920-*c* corresponds to the converter 920 when configured for V polarization and FFT calculations, and the converter 920-*d* corresponds to the converter 920 when configured for V polarization and IFFT calculations.

Figure 10:
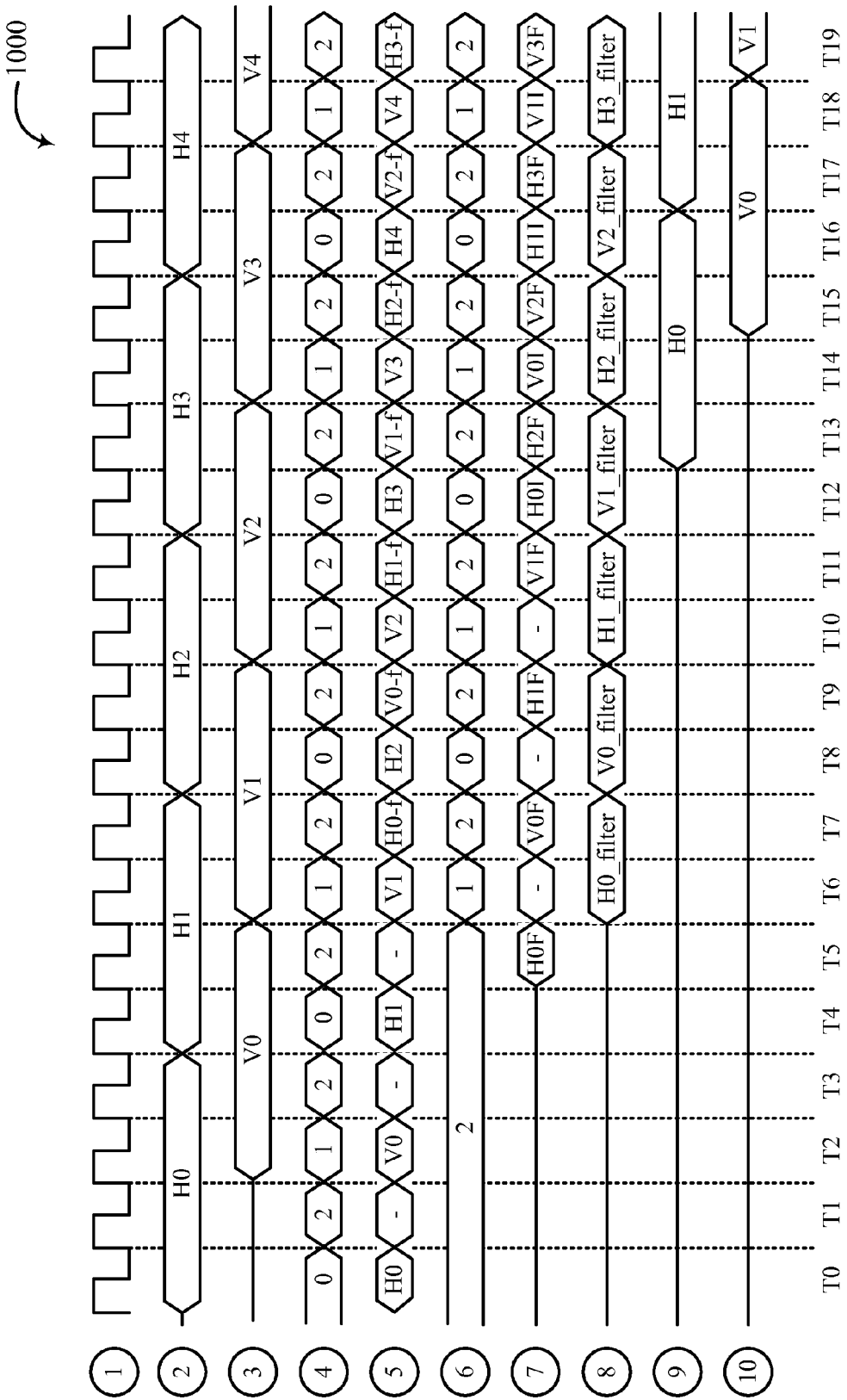
FIG. 10 is a diagram of an example of data timing for frequency-domain filtering according to various embodiments of the principles described herein.

In FIG. 10 a timing diagram 1000 is shown that illustrates the time-shared operation of the frequency domain filter 815-*a* in FIG. 9. A first signal, Signal 1, is shown at the top of the timing diagram 1000 and is labeled on the left side of the diagram with a number "1" inside a circle. Subsequent signals are shown below the previous signal and are similarly labeled. Signal 1 corresponds to a clock signal used to synchronize the operations of the frequency domain filter 815-*a*. Signal 2 represents the availability of different sets of samples (e.g., in-phase/quadrature samples) to the converter 920 from the H input buffer 905. Signal 3 represents the availability of different sets of samples (e.g., vertical in-phase/quadrature samples) to the converter 920 from the V input buffer 910. Signal 4 represents selections at the input of the MUX 915 as controlled by the controller 960. Signal 5 represents inputs to the converter 920 from the MUX 915. Signal 6 represents selections at the output of the MUX 925 as controlled by the controller 960. Signal 7 represents outputs from the converter 920 as selected by the MUX 915. Signal 8 represents outputs from the matched filter 930. Signal 9 represents the availability of corrected sets of samples (i.e., compensated for chromatic dispersion) from the H output buffer 945. Signal 10 represents the availability of corrected sets of samples (i.e., compensated for chromatic dispersion) from the V output buffer 950.

Below are provided some examples to illustrate the time-sharing operation of the frequency domain filter 815-*a* according to the timing diagram 1000. In a first example, a current set of samples that includes horizontal polarization samples (H0) is available from the H input buffer 905 from T0 through T3 (Signal 2). At T0, input "0" of the MUX 915 is selected (Signal 4) and the H0 samples are made available to the converter 920 at T0 for conversion to the frequency domain using FFT calculations (Signal 5). At T5, output "2" of the MUX 925 is selected (Signal 6) and the converted H0 samples (H0F) are made available to the matched filter 930 for filtering (Signal 7). The filtered H0 samples (H0_filter) are made available by the matched filter 930 between T6 and T7 (Signal 8). At T7, input "2" of the MUX 915 is selected (Signal 4) and the filtered H0 samples are provided as an input (H0-f) to the converter 920 for conversion to the time domain using IFFT calculations (Signal 5). At T12, output "0" of the MUX 925 is selected (Signal 6) and the frequency-to-time domain converted H0 samples (H0I) are made available to the H output buffer 945 (Signal 7). Between T13 and T16, the corrected H0 samples are made available at the output of the H output buffer 945.

In a second example, a next set of samples that includes vertical polarization samples (V0) is available from the V input buffer 910 from T2 through T5 (Signal 3). At T2, input "1" of the MUX 915 is selected (Signal 4) and the V0 samples are made available to the converter 920 at T2 for conversion to the frequency domain using FFT calculations (Signal 5). At T7, output "2" of the MUX 925 is selected (Signal 6) and the converted V0 samples (V0F) are made available to the matched filter 930 for filtering (Signal 7). The filtered V0 samples (V0_filter) are made available by the matched filter 930 between T8 and T9 (Signal 8). At T9, input "2" of the MUX 915 is selected (Signal 4) and the filtered V0 samples are provided as an input (V0-f) to the converter 920 for conversion to the time domain using IFFT calculations (Signal 5). At T14, output "1" of the MUX 925 is selected (Signal 6) and the frequency-to-time domain converted V0 samples (V0I) are made available to the V output buffer 950 (Signal 7). Between T15 and T18, the corrected V0 samples are made available at the output of the V output buffer 950.

Figure 11:
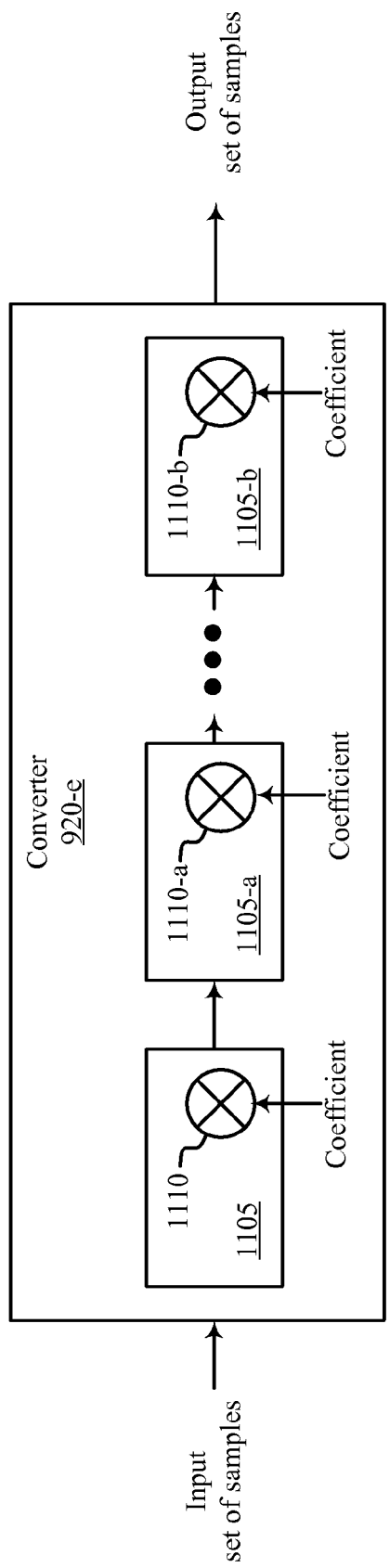
FIG. 11 is a block diagram of an example of a converter module according to various embodiments of the principles described herein.

FIG. 11 illustrates a converter 920-*e*. The converter 920-*e* may be an example of the converter 920 described above with reference to FIG. 9. In the illustrated embodiment, the converter 920-*e* is based on a pipelined architecture that includes multiple pipeline stages. To illustrate the use of multiple pipeline stages, FIG. 11 shows pipeline stages 1105, 1105-*a*, and 1105-*b*, however, the number of pipeline stages is typically greater than the number shown. Each of these components may be in communication, directly or indirectly.

The converter 920-*e* is configured into an FFT mode to convert an input set of samples from the time domain to the frequency domain. In the FFT mode, the pipeline stages 1105, 1105-*a*, and 1105-*b* are configured to perform FFT calculations on the input set of samples. Alternatively, the converter 920-*e* is configured into an IFFT mode to convert an input set of samples from the frequency domain to the time domain. In the IFFT mode, the same pipeline stages 1105, 1105-*a*, and 1105-*b* are configured to perform IFFT calculations on the input set of samples. The number of pipeline stages in the converter 920-*e* may vary depending on the size of the FFT/IFFT calculations.

Each pipeline stage in the converter 920-*e* has a corresponding multiplier. For example, pipeline stage 1105 is shown to include a multiplier 1110, pipeline stage 1105-*a* is shown to include a multiplier 1110-*a*, and pipeline stage 1105-*b* is shown to include a multiplier 1110-*b*. In certain examples, the multipliers may be positioned between stages instead of included within a pipeline stage as shown. The multipliers used in the pipelined architecture of the converter 920-*e* are constant multipliers but typically that is not the case. The multipliers 1110 through 1110-*b* may be implemented as constant multipliers because the size of the FFT/IFFT calculations is matched to the parallelism that is needed. It is because of this matching that the multipliers are constant multipliers. Accordingly, the coefficients or constants applied to the multipliers need not change during the FFT mode configuration or during the IFFT mode configuration. Constant multipliers may be used for both configurations by having the input set of samples have the same size as the size of the FFT/IFFT calculations performed by the converter 920-e.

Figure 12:
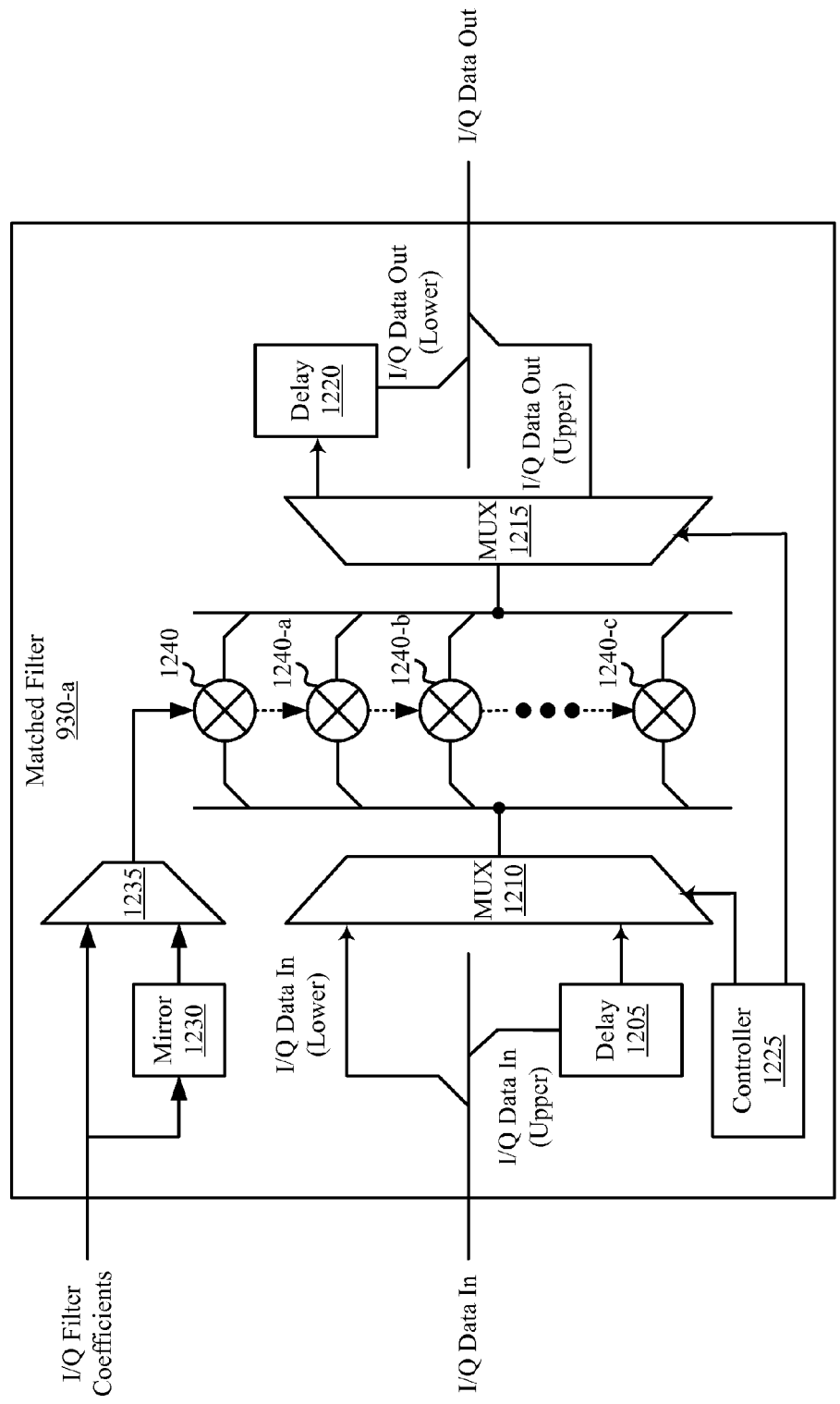
FIG. 12 is a block diagram of an example of a matched filter according to various embodiments of the principles described herein.

FIG. 12 illustrates a matched filter 930-a. The matched filter 930-a may be an example of the matched filter 930 described above with reference to FIG. 9. In the illustrated embodiment, the matched filter 930-a includes a delay 1205, a MUX 1210, a MUX 1215, a delay 1220, a controller 1225, a mirror 1230, and a combiner 1235. The matched filter 930-a also includes multiple complex multipliers. To illustrate the use of multiple complex multipliers, FIG. 12 shows complex multipliers 1240, 1240-a, 1240-b, and 1240-c, however, the number of complex multipliers is typically greater than the number shown. Each of these components may be in communication, directly or indirectly.

The matched filter 930-a receives an input set of samples (I/Q data in) in the frequency domain. The matched filter 930-a processes portions of the received samples sequentially. For example, a lower portion of the received samples is filtered first by having the MUX 1210 provide that portion of the received samples to the complex multipliers 1240, 1240-a, 1240-b, and 1240-c for filtering. An upper portion of the received samples is delayed by the delay 1205 before it is provided by the MUX 1210 to the multipliers 1240, 1240-a, 1240-b, and 1240-c for filtering. After filtering, the MUX 1215 first provides the lower portion of the received samples to the delay 1220 and subsequently provides the upper portion of the received samples to produce an output set of samples (I/Q data out). The controller 1225 controls and synchronizes the selection operations of the MUX 1210 and the MUX 1215.

In certain examples, the matched filter 930-a is a symmetric filter and the filter coefficients used by the complex multipliers 1240, 1240-a, 1240-b, and 1240-c are composed by receiving one half of the filter coefficients and have the mirror 1230 compute the other half of the filter coefficients by mirroring the first half. The combiner 1235 combines both halfs and provides the combined filter coefficients to the complex multipliers 1240, 1240-a, 1240-b, and 1240-c.

Figure 13A:
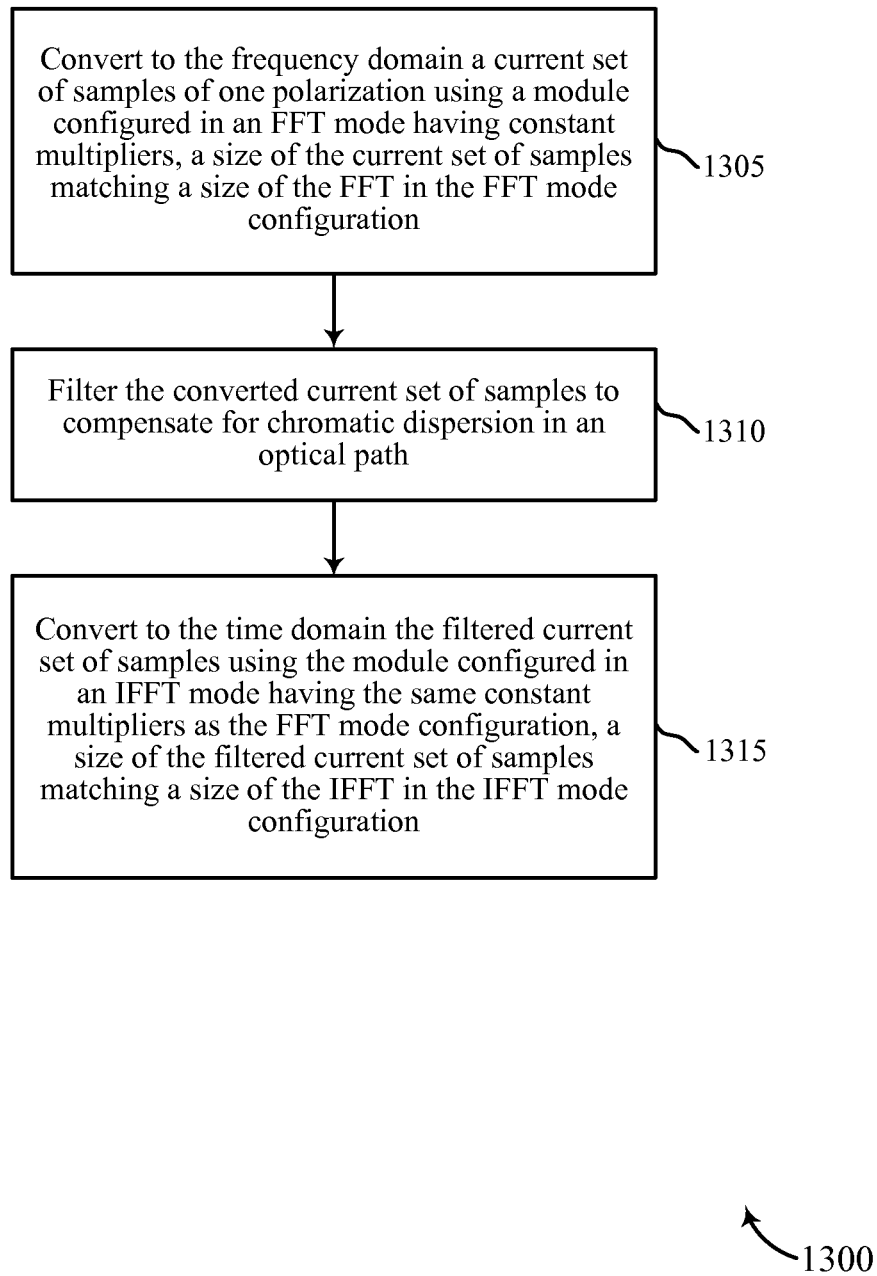
FIG. 13A is a flow chart of an example of a method for frequency-domain filtering to compensate for chromatic dispersion according to various embodiments of the principles described herein.

FIG. 13A illustrates a flowchart diagram of an example method 1300 for frequency-domain filtering to compensate for chromatic dispersion. The method 1300 may be performed using, for example, the digital demodulation and decoding units 125 and 125-a of FIG. 1 and FIG. 5, respectively; the demodulator modules 510, 510-a, and 510-b of FIG. 5, FIG. 6, and FIG. 7, respectively; the adaptive CD matched filter 625, 625-a, and 625-b of FIG. 6, FIG. 7, and FIG. 8, respectively; the frequency domain filter 815 and 815-a of FIG. 8 and FIG. 9, respectively; the converter 920 and 920-a of FIG. 9 and FIG. 11, respectively; the matched filter 930 and 930-a of FIG. 9 and FIG. 12, respectively; and/or the modem of FIG. 7.

At block 1305, a current set of samples of one polarization is converted to the frequency domain using a module (e.g., converter 920) configured in an FFT mode having constant multipliers, where a size of the current set of samples matches a size of the FFT in the FFT mode configuration. At block 1310, the converted current set of samples is filtered to compensate for chromatic dispersion. At block 1315, the filtered current set of samples is converted to the time domain using the module in an IFFT mode having the same constant multipliers as the FFT mode configuration, where a size of the filtered current set of samples matches a size of the IFFT in the IFFT mode configuration. The configuration of the module in the FFT mode is a pipeline configuration having the constant multipliers and the configuration of the module in the IFFT mode is a pipeline configuration having the same constant multipliers. In certain examples, the size of the current set of samples is the number of samples in the current set of samples and the size of the FFT in the FFT mode configuration is the number of points in the FFT. Similarly, the size of the IFFT in the IFFT mode configuration is the number of points in the FFT. Because the size of the FFT in the FFT mode configuration and the size of the IFFT in the IFFT mode configuration may be larger than what is generally or typically used for a single polaritzation, the FFT in the FFT mode configuration may be referred to as an extended, expanded, or lengthened FFT and the IFFT in the IFFT mode configuration may be referred to as an extended, expanded, or lengthened IFFT.

In some embodiments of the method 1300, the size of the FFT in the FFT mode and the size of the IFFT in the IFFT mode are substantially four times the size of the FFT and the IFFT used for a single polarization to enable FFT and IFFT time-sharing of horizontal and vertical polarizations and to enable the constant multipliers in the FFT mode configuration and in the IFFT mode configuration. In some embodiments, the size of the FFT (or extended FFT) and the size of the IFFT (or extended IFFT) may be more or less than four times the size of the FFT and the IFFT used for a single polarization, but may still be larger than what is generally or typically used for a single polaritzation. In certain examples of the method 1300, the current set of samples is determined from data included in one or more coherently received optical signals. In certain examples of the method 1300, the converted current set of samples is filtered while a next set of samples of a different polarization is converted to the frequency domain using the module in the FFT mode. The filtered current set of samples is converted to the time domain using the module in the IFFT mode while the converted next set of samples is filtered to compensate for chromatic dispersion in the optical path. Then, the filtered next set of samples is converted to the time domain using the module in the IFFT mode.

In some embodiments of the method 1300, samples of the one polarization are buffered to match the size of the current set of samples to the size of the FFT in the FFT mode configuration and samples of a different polarization are buffered to match the size of a next set of samples to the size of the FFT in the FFT mode configuration. The next set of samples are delayed with respect to the current set of samples. In some embodiments, the current set of samples includes a set of in-phase and quadrature samples of the one polarization and the next set of samples includes a set of in-phase and quadrature samples of a different polarization.

In some embodiments of the method 1300, the converted current set of samples is filtered using a matched filter (e.g., matched filter 930). One or more coefficients of the matched filter are dynamically adjusted based on at least one parameter corresponding to the optical path. In some embodiments, the filter coefficients may be adjusted by the coefficient calculator 810 described above with reference to FIG. 8.

Figure 13B:
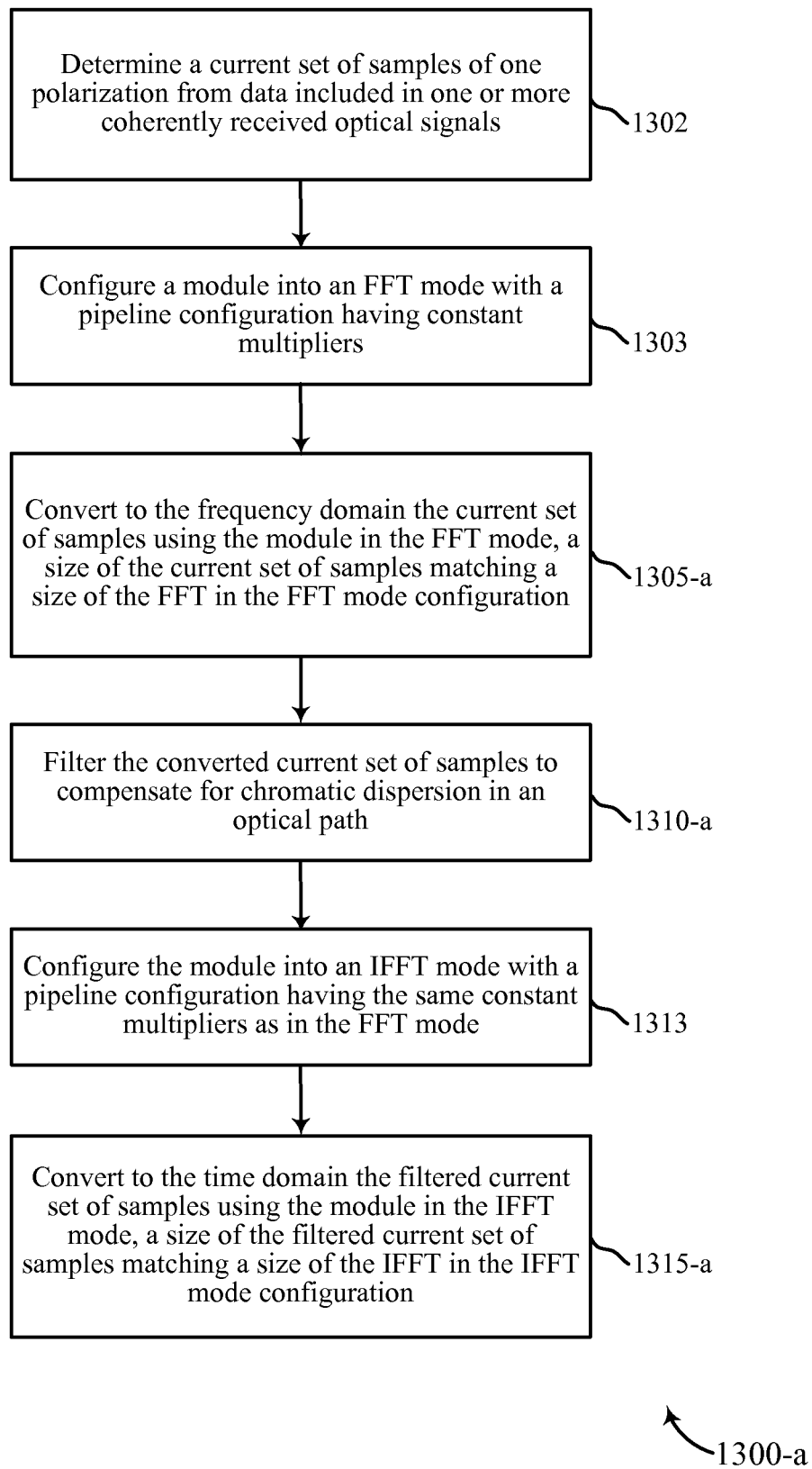
FIG. 13B is a flow chart of another example of a method for frequency-domain filtering to compensate for chromatic dispersion according to various embodiments of the principles described herein.

FIG. 13B illustrates a flowchart diagram of an example method 1300-a for frequency-domain filtering to compensate for chromatic dispersion. The method 1300-a, like the method 1300 above, may be performed using, for example, the digital demodulation and decoding units 125 and 125-a of FIG. 1 and FIG. 5, respectively; the demodulator modules 510, 510-a, and 510-b of FIG. 5, FIG. 6, and FIG. 7, respectively; the adaptive CD matched filter 625, 625-*a*, and 625-*b* of FIG. 6, FIG. 7, and FIG. 8, respectively; the frequency domain filter 815 and 815-*a* of FIG. 8 and FIG. 9, respectively; the converter 920 and 920-*a* of FIG. 9 and FIG. 11, respectively; the matched filter 930 and 930-*a* of FIG. 9 and FIG. 12, respectively; and/or the modem of FIG. 7.

At block 1302, a current set of samples of one polarization are determined from data included in one or more coherently received optical signals. At block 1303, a module (e.g., converter 920) is configured in an FFT mode with a pipeline configuration having constant multipliers. An example of a pipeline configuration is described above with reference to FIG. 11.

At block 1305-*a*, the current set of samples are converted to the frequency domain using the module now configured in the FFT mode, a size of the current set of samples matching a size of the FFT in the FFT mode configuration. At block 1310-*a*, the converted current set of samples is filtered to compensate for chromatic dispersion. At block 1313, the module is configured in an IFFT mode with a pipeline configuration having the same constant multipliers as in the FFT mode. At block 1315-*a*, the filtered current set of samples is converted to the time domain using the module now in the IFFT mode, a size of the filtered current set of samples matching a size of the IFFT in the IFFT mode configuration.

Figure 13C:
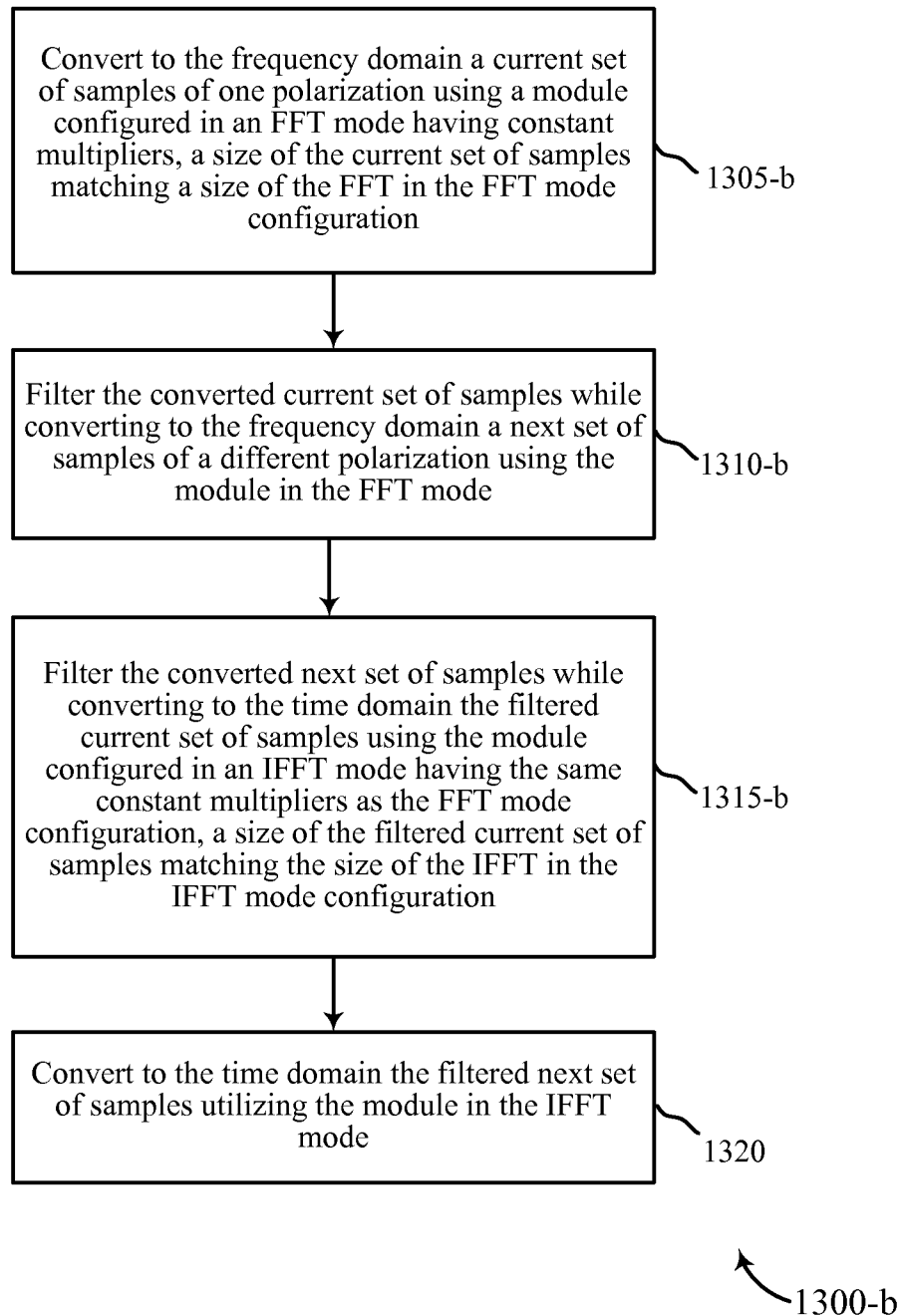
FIG. 13C is a flow chart of yet another example of a method for frequency-domain filtering to compensate for chromatic dispersion according to various embodiments of the principles described herein.

FIG. 13C illustrates a flowchart diagram of an example method 1300-*b* for frequency-domain filtering to compensate for chromatic dispersion. The method 1300-*b*, like the methods 1300 and 1300-*a* above, may be performed using, for example, the digital demodulation and decoding units 125 and 125-*a* of FIG. 1 and FIG. 5, respectively; the demodulator modules 510, 510-*a*, and 510-*b* of FIG. 5, FIG. 6, and FIG. 7, respectively; the adaptive CD matched filter 625, 625-*a*, and 625-*b* of FIG. 6, FIG. 7, and FIG. 8, respectively; the frequency domain filter 815 and 815-*a* of FIG. 8 and FIG. 9, respectively; the converter 920 and 920-*a* of FIG. 9 and FIG. 11, respectively; the matched filter 930 and 930-*a* of FIG. 9 and FIG. 12, respectively; and/or the modem of FIG. 7.

At block 1305-*b*, a current set of samples of one polarization is converted to the frequency domain using a module (e.g., converter 920) configured in an FFT mode having constant multipliers, where a size of the current set of samples matches a size of the FFT in the FFT mode configuration. At block 1310-*b*, the converted current set of samples is filtered to compensate for chromatic dispersion while a next set of samples of a different polarization is converted to the frequency domain using the module in the FFT mode. At block 1315-*b*, the converted next set of samples is filtered to compensate for chromatic dispersion while the filtered current set of samples is converted to the time domain using the module in an IFFT mode having the same constant multipliers as the FFT mode configuration, where a size of the filtered current set of samples matches a size of the IFFT in the IFFT mode configuration. At block 1320, the converted next set of samples converted to the time domain using the module in the IFFT mode.

In some embodiments, a system for filtering data from an optical signal includes means for converting to the frequency domain a current set of samples of one polarization using a module configured in a FFT mode, where the FFT mode configuration has constant multipliers and where a size of the current set of samples matches a size of the FFT in the FFT mode configuration. The means may include, but need not be limited to, one or more of a converter, a multiplexer, a controller, and a buffer as illustrated in FIG. 9A, FIG. 9B, and/or FIG. 11. The system may also include means for filtering the converted current set of samples to compensate for chromatic dispersion in an optical path. The means may include, but need not be limited to, one or more of a matched filter, a multiplexer, and a controller as illustrated in FIG. 9A and/or FIG. 12, for example. The system may further include means for converting to the time domain the filtered current set of samples utilizing the same module configured in an IFFT mode, where the IFFT mode configuration has the same constant multipliers as the FFT mode configuration, and where a size of the filtered current set of samples matches a size of the IFFT in the IFFT mode configuration. The means may include, but need not be limited to, one or more of a converter, a multiplexer, a controller, and a buffer as illustrated in FIG. 9A, FIG. 9B, and/or FIG. 11, for example.

The system may also include means for determining the current set of samples from data included in one or more coherently received optical signals. The means may include, but need not be limited to, one or more of a buffer, a multiplexer, and a controller as illustrated in FIG. 9A and/or FIG. 9B, for example. The system may also include means for filtering the converted current set of samples while converting to the frequency domain a next set of samples of a different polarization using the module in the FFT mode. The means may include, but need not be limited to, one or more of a matched filter, a buffer, a multiplexer, a converter, and a controller as illustrated in FIG. 9A, FIG. 9B, FIG. 11, and/or FIG. 12, for example. The system may further include means for converting to the time domain the filtered current set of samples using the module in the IFFT mode while filtering the converted next set of samples to compensate for chromatic dispersion in the optical path. The means may include, but need not be limited to, one or more of a converter, a buffer, a multiplexer, a matched filter, and a controller as illustrated in FIG. 9A, FIG. 9B, FIG. 11, and/or FIG. 12, for example. Moreover, the system may include means for converting to the time domain the filtered next set of samples using the module in the IFFT mode. The means may include, but need not be limited to, one or more of a converter, a multiplexer, a controller, and a buffer as illustrated in FIG. 9A, FIG. 9B and/or FIG. 11, for example.

While the various embodiments and examples described above have been illustrated with reference to optical communication systems that use fiber optic cables as a data transmission medium or path, those embodiments and examples may also be applicable to systems in which communications occur through other types of transmission media or paths. For example, some or all of the embodiments and examples described above may be applicable to communications through free space or similar media in which electromagnetic signals are radiated, such as cellular communications, point-to-point communications, and satellite communications, to name a few.

As will be readily understood, the components and modules described with reference to various embodiments above may, individually or collectively, be implemented with one or more Application Specific Integrated Circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs) and other Semi-Custom ICs), which may be programmed in any manner known in the art. The functions of each unit may also be implemented, in whole or in part, with instructions embodied in a memory, formatted to be executed by one or more general or application-specific processors.

It should be noted that the methods, systems and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted or combined. Also, features described with respect to certain embodiments may be combined in various other embodiments. Different aspects and elements of the embodiments may be combined in a similar manner. Also, it should be emphasized that technology evolves and, thus, many of the elements are exemplary in nature and should not be interpreted to limit the scope of embodiments of the principles described herein.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a computer-readable medium such as a storage medium. Processors may perform the necessary tasks.

Having described several embodiments, it will be recognized by those of skill in the art that various modifications, alternative constructions, and equivalents may be used without departing from the spirit of the principles described herein. For example, the above elements may merely be a component of a larger system, wherein other rules may take precedence over or otherwise modify the application of the principles described herein. Also, a number of steps may be undertaken before, during, or after the above elements are considered. Accordingly, the above description should not be taken as limiting the scope of the invention.

What is claimed is:

1. A method for filtering data from an optical signal, comprising:
   converting to the frequency domain a current set of samples of one polarization utilizing a module configured in a Fast Fourier Transform (FFT) mode, the FFT mode configuration having constant multipliers, and a size of the current set of samples matching a size of the FFT in the FFT mode configuration;
   filtering the converted current set of samples to compensate for chromatic dispersion in an optical path while converting to the frequency domain a next set of samples of a different polarization utilizing the module in the FFT mode;
   converting to the time domain the filtered current set of samples utilizing the same module configured in an Inverse Fast Fourier Transform (IFFT) mode while filtering the converted next set of samples to compensate for chromatic dispersion in the optical path, the IFFT mode configuration having the same constant multipliers as the FFT mode configuration, and a size of the filtered current set of samples matching a size of the IFFT in the IFFT mode configuration; and
   converting to the time domain the filtered next set of samples utilizing the module in the IFFT mode.

2. The method of claim 1, wherein:
   the size of the FFT in the FFT mode and the size of the IFFT in the IFFT mode are substantially four times the size of the FFT and the IFFT utilized for a single polarization to enable FFT and IFFT time-sharing of horizontal and vertical polarizations and to enable the constant multipliers in the FFT mode configuration and in the IFFT mode configuration.

3. The method of claim 1, further comprising:
   determining the current set of samples from data included in one or more coherently received optical signals.

4. The method of claim 1, further comprising:
   filtering the converted current set of samples utilizing a matched filter.

5. The method of claim 1, further comprising:
   configuring the module in the FFT mode, the configuration being a pipeline configuration having the constant multipliers.

6. The method of claim 1, further comprising:
   configuring the module in the IFFT mode, the configuration being a pipeline configuration having the constant multipliers.

7. The method of claim 1, further comprising:
   buffering samples of the one polarization to match the size of the current set of samples to the size of the FFT in the FFT mode configuration;
   buffering samples of the different polarization to match the size of the next set of samples to the size of the FFT in the FFT mode configuration; and
   delaying the next set of samples with respect to the current set of samples.

8. The method of claim 1, wherein the current set of samples comprises a set of in-phase and quadrature samples of the one polarization and the next set of samples comprises a set of in-phase and quadrature samples of the different polarization.

9. The method of claim 1, further comprising:
   dynamically adjusting one or more coefficients of a matched filter configured to compensate for chromatic dispersion in the optical path, the adjusting being based on at least one parameter corresponding to the optical path.

10. The method of claim 1, wherein:
    the size of the current set of samples is the number of samples in the current set of samples, and
    the size of the FFT in the FFT mode configuration is the number of points in the FFT.

11. A system for filtering data from an optical signal, comprising:
    means for converting to the frequency domain a current set of samples of one polarization and a next set of samples of a different polarization utilizing a module configured in a Fast Fourier Transform (FFT) mode, the FFT mode configuration having constant multipliers, and a size of the current set of samples matching a size of the FFT in the FFT mode configuration;
    means for filtering the converted current set of samples and the converted next set of samples to compensate for chromatic dispersion in an optical path, wherein the converted current set of samples is filtered while the means for converting to the frequency domain converts the next set of samples; and means for converting to the time domain the filtered current set of samples and the filtered next set of samples utilizing the same module configured in an Inverse Fast Fourier Transform (IFFT) mode, wherein the filtered current set of samples is converted to the time domain while the means for filtering filters the converted next set of samples, the IFFT mode configuration having the same constant multipliers as the FFT mode configuration, and a size of the filtered current set of samples matching a size of the IFFT in the IFFT mode configuration.

12. The system of claim 11, wherein:

the size of the FFT in the FFT mode and the size of the IFFT in the IFFT mode are substantially four times the size of the FFT and the IFFT utilized for a single polarization to enable FFT and IFFT time-sharing of horizontal and vertical polarizations and to enable the constant multipliers in the FFT mode configuration and in the IFFT mode configuration.

13. The system of claim 11, further comprising:

means for determining the current set of samples from data included in one or more coherently received optical signals.

14. A receiver device, comprising:

a conversion module configured in a Fast Fourier Transform (FFT) mode to convert to the frequency domain a current set of samples of one polarization and to convert to the frequency domain a next set of samples of a different polarization, the FFT mode configuration having constant multipliers, and a size of the current set of samples matching a size of the FFT in the FFT mode configuration; and a filter module configured to filter the converted current set of samples to compensate for chromatic dispersion in an optical path while the conversion module converts to the frequency domain the next set of samples of the different polarization, and to filter the converted next set of samples to compensate for chromatic dispersion in the optical path, wherein the conversion module is configured in an Inverse Fast Fourier Transform (IFFT) mode to convert to the time domain the filtered current set of samples while the filter module filters the converted next set of samples, and to convert to the time domain the filtered next set of samples, the IFFT mode configuration having the same constant multipliers as the FFT mode configuration, and a size of the filtered current set of samples matching a size of the IFFT in the IFFT mode configuration.

15. The receiver device of claim 14, wherein:

the size of the FFT in the FFT mode and the size of the IFFT in the IFFT mode are substantially four times the size of the FFT and the IFFT utilized for a single polarization to enable FFT and IFFT time-sharing of horizontal and vertical polarizations and to enable the constant multipliers in the FFT mode configuration and in the IFFT mode configuration.

16. The receiver device of claim 14, wherein:

the filter module comprises a matched filter to compensate for chromatic dispersion in the optical path.

17. The receiver device of claim 14, wherein:

the conversion module in the FFT mode comprises a pipeline configuration having the constant multipliers, and the conversion module in the IFFT mode comprises a pipeline configuration having the constant multipliers.

18. The receiver device of claim 14, further comprising:

a first buffer configured to buffer samples of the one polarization to match the size of the current set of samples to the size of the FFT in the FFT mode configuration; and a second buffer configured to buffer samples of the different polarization to match the size of the next set of samples to the size of the FFT in the FFT mode configuration, the second buffer being configured to delay the next set of samples with respect to the current set of samples.

19. The receiver device of claim 14, wherein the current set of samples comprises a set of in-phase and quadrature samples of the one polarization and the next set of samples comprises a set of in-phase and quadrature samples of the different polarization.

\* \* \* \* \*